United States Patent
Zhou

(10) Patent No.: US 8,351,524 B2
(45) Date of Patent: Jan. 8, 2013

(54) MIMO-OFDM COMMUNICATION SYSTEM AND COMMUNICATION METHOD OF SAME

(75) Inventor: Liang Zhou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 699 days.

(21) Appl. No.: 12/470,249

(22) Filed: May 21, 2009

(65) Prior Publication Data

US 2009/0285325 A1    Nov. 19, 2009

Related U.S. Application Data

(63) Continuation of application No. PCT/JP2007/064572, filed on Jul. 25, 2007.

(30) Foreign Application Priority Data

Nov. 22, 2006  (JP) ................................. 2006-314947

(51) Int. Cl.
*H04K 1/10* (2006.01)
*H04L 27/28* (2006.01)

(52) U.S. Cl. ......... 375/260; 375/285; 375/296; 370/206

(58) Field of Classification Search .......... 375/259–260, 375/267, 285, 295–296, 299, 316, 346–347, 375/349, 340–341; 370/203, 206
See application file for complete search history.

(56) References Cited

U.S. PATENT DOCUMENTS

| 7,068,628 | B2 | 6/2006 | Li et al. |
| 2005/0180517 | A1 | 8/2005 | Abe |
| 2006/0018247 | A1 | 1/2006 | Driesen et al. |
| 2006/0092882 | A1 | 5/2006 | Ghosh et al. |
| 2006/0182192 | A1 | 8/2006 | Takano |
| 2007/0196072 | A1* | 8/2007 | Zhou et al. .................... 385/147 |
| 2007/0280386 | A1* | 12/2007 | Waes et al. .................... 375/347 |
| 2008/0037675 | A1* | 2/2008 | Lin et al. ....................... 375/262 |
| 2008/0049597 | A1* | 2/2008 | Walker et al. ................ 370/204 |

FOREIGN PATENT DOCUMENTS

| CN | 1658605 A | 8/2005 |
| EP | 1185001 A2 | 3/2002 |

(Continued)

OTHER PUBLICATIONS

Japanese Notification of Reason for Refusal dated Aug. 16, 2011 for application No. 2008-545323.

(Continued)

*Primary Examiner* — Jean B Corrielus
(74) *Attorney, Agent, or Firm* — Murphy & King, P.C.

(57) ABSTRACT

A MIMO-OFDM communication method for transmitting and receiving data using MIMO-OFDM communication has, on the transmitting side, a step of performing precoding processing of transmission data using a prescribed precoding method, and a step of performing OFDM modulation of the precoding-processed data and transmitting the data from a plurality of transmission antennas, and has, on the receiving side, a step of performing MIMO decoding processing of reception signals received by a plurality of reception antennas according to a ZF decoding algorithm or an MMSE decoding algorithm, and outputting the data as a transmission data stream, a step of calculating weighting coefficients according to the precoding method, and a step of performing weighted decoding processing of the transmission data obtained by the MIMO decoding processing, by multiplying path metric of the decoding processing by the weighting coefficients.

9 Claims, 22 Drawing Sheets

FOREIGN PATENT DOCUMENTS

| | | |
|---|---|---|
| JP | 2003244103 | 8/2003 |
| JP | 2005150914 | 6/2005 |
| JP | 200642342 | 2/2006 |
| JP | 2006165970 | 6/2006 |
| JP | 2006203685 A | 8/2006 |
| WO | 2005046113 | 5/2005 |
| WO | 2005046113 A2 | 5/2005 |
| WO | 2006095873 | 9/2006 |
| WO | 2006107700 A2 | 10/2006 |

OTHER PUBLICATIONS

Notification of Reasons for Refusal dated May 31, 2011 in corresponding Japanese Patent Application No. 2008-545323.

Chinese First Notification of Office Action dated Mar. 23, 2012 issued in application No. 200780040642.2.

Limited Feedback Unitary Precoding for Spatial Multiplexing Systems, David J. Love and Robert W. Heath, Jr., IEE Transaction Information Theory, vol. 51, No. 8, Aug. 30, 2005.

International Search Report dated Sep. 4, 2007, for PCT/JP2007/064572.

Katsunari Honjo, Tomoaki Otsuki, Low Complexity MLD Signal Detection With MMSE/OSD in "MIMO System ni Okeru MMSE/OSD o Heiyo shita Tei Enzanryo MLD Shingo Kenshutsuh", May 14, 2004, vol. 104, No. 63, pp. 25 to 30, RCS2004-60.

Love, D.J.; Heath, R.W.Jr., "Limited feedback unitary precoding for spatial multiplexing system", In: Information Theory, IEEE Transactions on, vol. 51, Issue 8, pp. 2967-2976; Aug. 2005.

\* cited by examiner

FIG. 2

INPUT: data stream : 1 2 3 4 5 6 7 8 9

OUTPUT:
data stream 1 : 1 4 7
data stream 2 : 2 5 8
data stream 3 : 3 6 9

FIG. 4
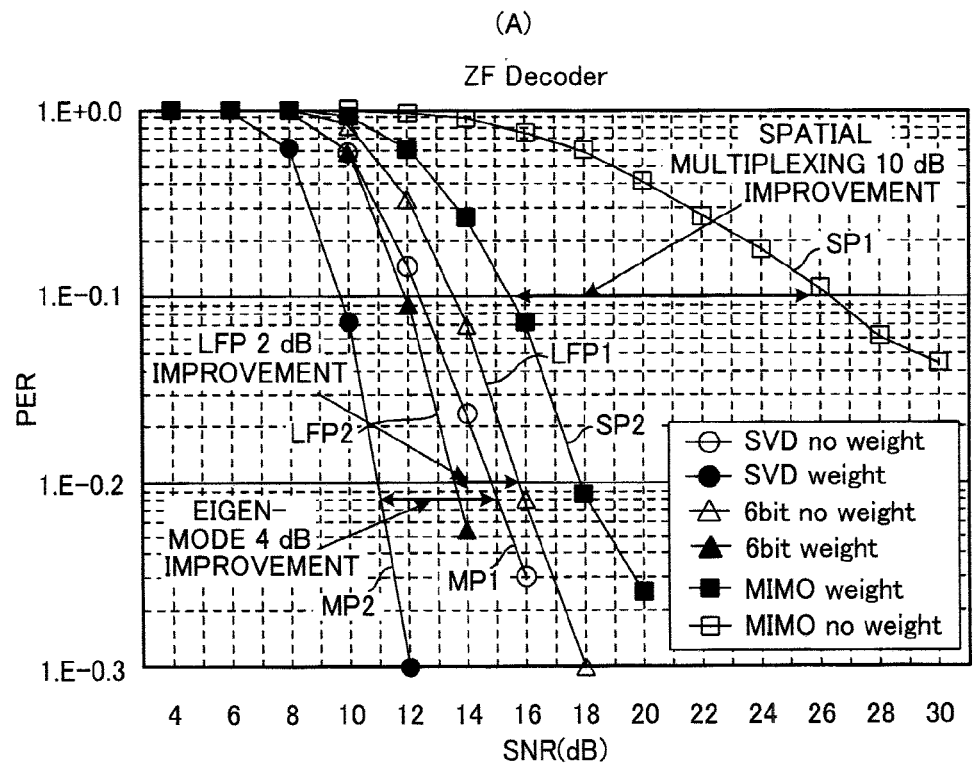
(A) ZF Decoder
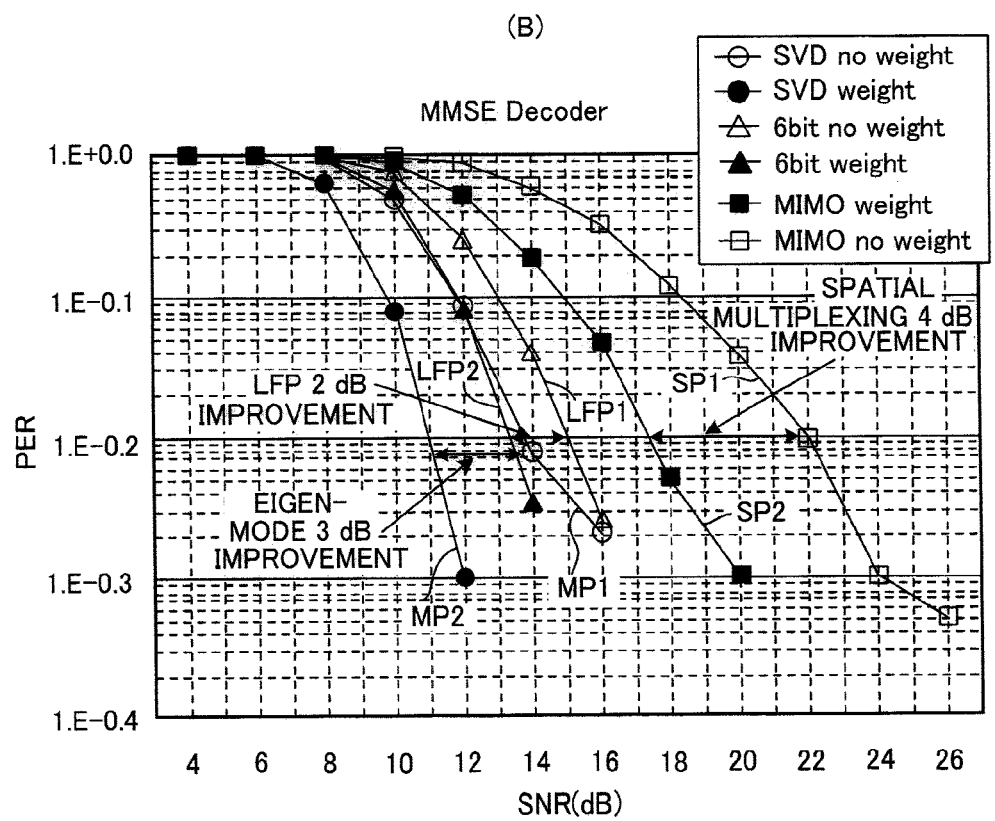
(B) MMSE Decoder

FIG. 9

INPUT STREAM data stream 1 : 11 12 13 14 15 16 17 18 19
data stream 2 : 21 22 23 24 25 26 27 28 29
data stream 3 : 31 32 33 34 35 36 37 38 39

OUTPUT STREAM data stream 1 : 11 21 31 14 24 34 17 27 37
data stream 2 : 12 22 32 15 25 35 18 28 38
data stream 3 : 13 23 33 16 26 36 19 29 39

FIG. 13
(A)
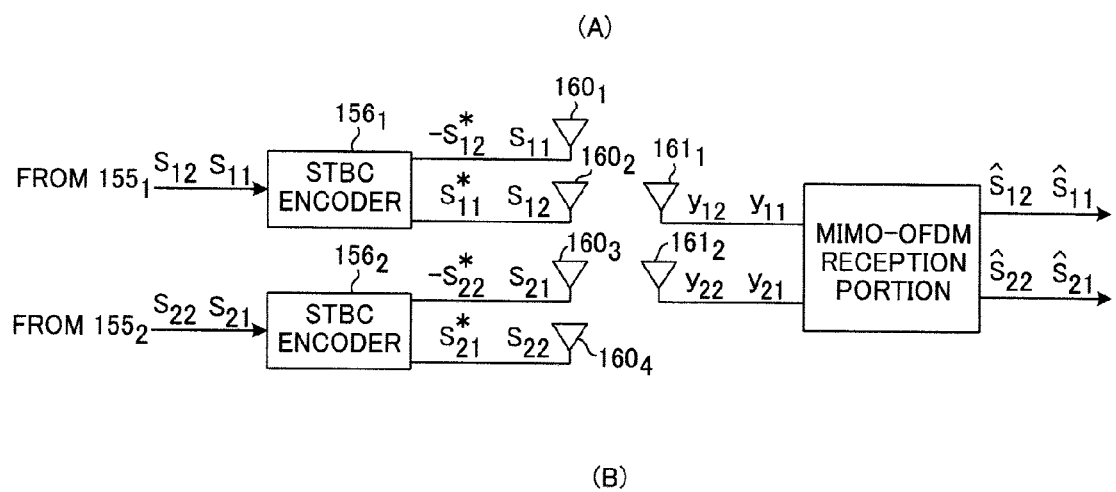
(B)
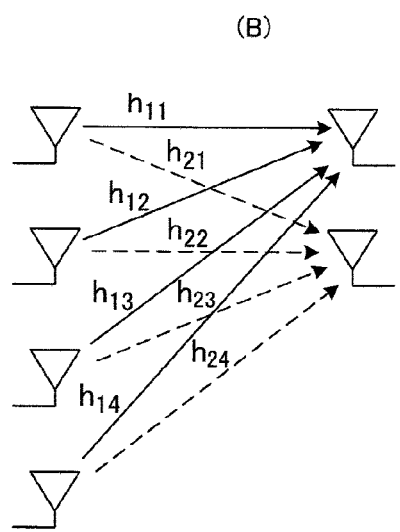
FIG. 14
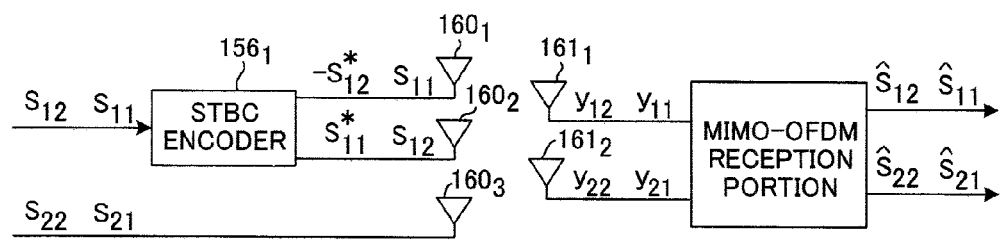

MIMO-OFDM COMMUNICATION SYSTEM AND COMMUNICATION METHOD OF SAME

CROSS-REFERENCE TO RELATED APPLICATIONS

This application is a continuation application of international PCT application No. PCT/JP2007/064572 filed on Jul. 25, 2007.

BACKGROUND OF THE INVENTION

The present invention relates to a MIMO-OFDM communication system and a MIMO-OFDM communication method thereof, and in particular relates to a MIMO-OFDM communication system and a MIMO-OFDM communication method which enable improvement of system performance and reduction of complexity, in a digital wireless communication system such as a next-generation wireless LAN which send and receive data by means of MIMO-OFDM communication and a spatial multiplexing OFDM system.

Among current wireless communication systems, attention is being paid to spatial multiplexing technology which increases transmission capacity in proportion to the number of transmission antennas, by transmitting different data streams in parallel from a plurality of transmission antennas. Different transmission antennas are placed so as to be mutually uncorrelated, and the data stream transmitted from each of the antennas passes through independent fading transmission path and is received by each of reception antennas.

Here, a plurality of reception antennas, placed so as to be mutually uncorrelated, are utilized in a multiple-input, multiple-output (MIMO) system, thereby a channel correlation matrix with a high degree of freedom can be generated, and the SNR when separating spatial multiplexed data streams can be improved.

FIG. 21 is an explanatory diagram of the configuration of a MIMO system; TR is a transmitting station, and RV is a receiving station. Data streams $S_1$ to $S_M$ in the same number as the plurality M of transmission antennas $ATT_1$ to $ATT_M$ undergo data modulation, oversampling, D/A conversion, orthogonal modulation, frequency upconversion, band-limiting filtering, and other processing by respective transmission portions $TX_1$ to $TX_M$, and are transmitted from transmission antennas $ATT_1$ to $ATT_M$. Signals transmitted from the antennas $ATT_1$ to $ATT_M$ pass through independent fading channels $h_{mn}$ (m=1 to M, n=1 to N), and after spatial multiplexing, are received by N reception antennas $ATR_1$ to $ATR_N$. Signals received by the reception antennas undergo, in respective reception portions $RX_1$ to $RX_n$, filtering, frequency downconversion, orthogonal detection, and A/D conversion processing, and reception data streams $y_1$ to $y_N$ are generated. Because the M transmitted data streams are multiplexed into each of the received data streams, by performing signal processing of all of the received data streams in a data processing unit DPU, the transmitted data streams are separated and reproduced.

Algorithms used in signal processing to separate received signals into the transmitted data streams $S_1$ to $S_M$ include such linear algorithms as the ZF (Zero-Forcing) algorithm, employing the inverse matrix of the channel correlation matrix, and the MMSE (Minimum Mean Square Error) algorithm, and nonlinear algorithms, of which the BLAST (Bell Laboratories Layered Space-Time) algorithm is representative. In additions, methods which do not use computation of the inverse matrix of the correlation matrix, such as the MLD (Maximum Likelihood Decoding) algorithm, are also known.

If the transmitted data streams are represented by an M-dimensional complex vector S, and the received data streams are represented by an N-dimensional complex vector Y, then the following relation obtains.

$$Y=HS+V \quad (1)$$

Here H is an N×M complex channel matrix ($h_{11}$-$h_{NM}$) and V is a N-dimensional AWGN vector.

In the ZF algorithm, the following equation is used to estimate a transmitted data stream.

$$\hat{S}=(H^*H)^{-1}H^*Y \quad (2)$$

Here "*" indicates the complex conjugate transpose of a matrix, and H*H is called the channel correlation matrix.

In the MMSE algorithm, the following equation is used to estimate transmitted data streams.

$$\hat{S}=(H^*H+\alpha I)^{-1}H^*Y$$

$$\alpha=\sigma_V/\sigma_S=M/\rho$$

$$E[SS^*]=\sigma_S I \quad (3)$$

Here ρ is equivalent to the SNR per reception antenna. In MMSE, the need arises to precisely estimate the SNR; but because the effect of noise emphasis can be reduced, in general characteristics are superior to those of the ZF algorithm.

In the MLD algorithm, the following equation is used to estimate transmitted data streams.

$$\hat{S} = \operatorname*{argmin}_k \|Y - HS_k\|^2 \; S_k \in \{S_1 \ldots S_K\} \; K = Q^M \quad (4)$$

Here Q is the number of signal points of the modulated data; for QPSK, Q=4, for 16QAM, Q=16, and for 64QAM Q=64. Thus in MLD the amount of computation for multi-valued modulation becomes enormous, and moreover the amount of computation increases exponentially with the number of transmission antennas.

In MIMO-OFDM transmission and reception, the transmission portion of the transmitting station TR and reception portion of the receiving station RV in FIG. 21 are configured as an OFDM (Orthogonal Frequency Division Multiplexing) transmission portion and OFDM reception portion.

FIG. 22 shows the configuration of a MIMO-OFDM system of the prior art. On the transmitting side, the FEC encoder 1 uses a convolution code to perform encoding processing for error detection and correction on the input data stream, the puncture portion 2 performs puncture processing according to the coding rate for the encoded data series, and the spatial interleaver 3 divides the punctured data bit series into plural data streams, viz. Ns data streams in the figure. Then, the frequency interleavers $4_1$ to $4_{Ns}$ perform frequency interleaving in which the positions of the input serial data (subcarrier signal components) are interchanged. The constellation mappers $5_1$ to $5_{Ns}$ perform constellation mapping of the signal components for the number of subcarriers, according to the data modulation method (BPSK, QPSK, 16QAM, 64QAM, and similar) indicated by an adaptive control portion (not shown). Then, the precoder 6 multiplies each of the Ns group parallel data streams by a precoding matrix, and converts the Ns data streams into Nt data streams. Precoding processing is performed to obtain the advantages of transmission diversity and to reduce interchannel interference.

The IFFT (Inverse Fast Fourier Transform) portions $7_1$ to $7_{Nt}$ convert the series-input data from the precoder 6 into parallel data for the number of subcarriers, and then perform IFFT (inverse Fourier transform) of this parallel data, combining the data in discrete time signals (OFDM signals), which are output. The guard interval insertion portions $8_1$ to $8_{Nt}$ insert guard intervals in the OFDM signals input from the IFFT portions, and the transmission portions (TX) $9_1$ to $9_{Nt}$ perform DA conversion of the OFDM signals with guard intervals inserted, convert the OFDM signal frequency from the baseband frequency to the wireless band, performs high-frequency amplification, and transmits the signals from the antennas $10_1$ to $10_{Nt}$.

Signals transmitted from the transmission antennas $10_1$ to $10_{Nt}$ pass through fading channels (propagation paths) and are received by reception antennas $11_1$ to $11_{Nr}$ of the reception device; reception circuits (Rx) $12_1$ to $12_{Nr}$ convert the RF signals received by the antennas into baseband signals, perform AD conversion to convert the baseband signals into digital signals, and output the signals. The symbol extraction portions $13_1$ to $13_{Nr}$ delete guard intervals GI and extract OFDM symbols with FFT timing, and input the results to the FFT portions $14_1$ to $14_r$. The FFT portions $14_1$ to $14_r$ perform FFT processing for each extracted OFDM symbol, converting the symbols to frequency-domain subcarrier samples.

The channel estimation circuit 15 performs channel estimation for each subcarrier, and inputs channel state information CSI (channel H(k)) to the transmission side and MIMO processing portion 16. H(k) is channel matrix of the kth subcarrier.

The transmission-side precoder 6 determines the precoding matrix based on the notified channel, and an adaptive control portion, not shown, determines the data modulation method using an adaptive control, and inputs the results to each of the constellation mappers $5_1$ to $5_{Ns}$.

For each subcarrier, the MIMO processing portion 16 uses the estimated channel to separate and output Ns transmission data streams from received signals according to a prescribed signal algorithm.

Subsequently, the constellation demappers $17_1$ to $17_{Ns}$, frequency deinterleavers $18_1$ to $18_{Ns}$, spatial deinterleaver 19, depuncture portion 20, and decoding portion 21 perform demapping processing, frequency deinterleave processing, spatial demapping processing, decoding processing to demodulate and decode the transmitted data, in the opposite order of the processes performed on the transmitting side, and outputs the results.

The transmission-side precoder 6 performs precoding by multiplying the Ns data streams by the precoding matrix F(k) which is in conformity with the spatial multiplexing precoding method, eigen-mode transfer precoding method, or limited feedback precoding method.

If the channel H(k) is unknown, the precoder 6 uses the identity matrix as the precoding matrix F(k), multiplying the transmission data stream by this precoding matrix F(k) to execute precoding (spatial multiplexing precoding method). If the channel state information CSI (channel H(k)) is known on the transmitting side and on the receiving side, then the precoder 6 performs singular value decomposition (SVD) of the channel matrix H(k), takes the decomposed matrix to be the precoding matrix F(k), and multiplies the transmission data stream by this matrix F(k) to execute precoding (eigen-mode transfer precoding method). And, if the precoding matrix F(k) adapted to the channel is fed back from the receiving side, then the precoder 6 multiplies the transmission data stream by this precoding matrix F(k) to execute precoding (limited feedback precoding method).

In the eigen-mode transfer precoding method and the limited feedback precoding method, the transmitting side must utilize channel state information (CSI) or partial CSI. Further, in the eigen-mode transfer precoding method, the transmitting side is required to perform adaptive modulation control and power control.

FIG. 23 shows another configuration of a conventional MIMO-OFDM communication device; differences with the MIMO-OFDM communication device of FIG. 22 are the provision of a STBC (Space Time Block Coding) portion 6' in place of the precoder 6, and the STBC portion 6' performs the space time block coding of each of Ns data streams and maps the results of the STBC to Nt antennas, in order to obtain transmission diversity. That is, the STBC encoders $6_1'$ to $6_{Ns}'$ of the STBC portion 6' perform STBC coding processing of data input from the respective constellation mappers $5_1$ to $5_{Ns}$ and output the results. FIG. 24 explains STBC encoding processing; the STBC encoder $6_i'$ converts continuous two-symbol data $[x_0, x_1]$ with period T into two symbol data series. The first data series is $[x_0, -x_1^*]$, and the second data series is $[x_1, x_0^*]$. Here "*" denotes the complex conjugate. The two data series are each OFDM processed and input to two transmission antennas. In FIG. 24, only the OFDM transmission configuration for one data stream is shown, but a similar configuration for the other data stream is comprised.

In the conventional MIMO-OFDM system (spatial multiplexing precoding method, eigen-mode transfer precoding method, limited feedback precoding method) of FIG. 22, in order to enhance performance, an MLD algorithm is used. And in the conventional hybrid STBC spatial multiplexing OFDM system of FIG. 23 or hybrid SFBC spatial multiplexing OFDM system also, in order to enhance performance, an MLD algorithm is used. Here "SFBC" is an abbreviation of "Space Frequency Block Coding".

However, in the MLD algorithm an extremely large number of computations are performed, and so there is the problem that implementation using this algorithm entails enormous complexity. Hence in order to reduce complexity, a ZF algorithm or an MMSE algorithm is used, and in order to improve performance a repeated decoding algorithm (VBLAST algorithm) or similar is used. However, if a ZF algorithm or MMSE algorithm is used to reduce complexity, the problem of degradation of error rate performance occurs. And if the VBLAST algorithm is used to improve performance, there is the problem that the complexity and processing delay are increased. In conventional MIMO-OFDM communication, adaptive modulation control and power control based on the reception state must be adopted; this control further increases system complexity, and is undesirable from the standpoints of cost and power consumption. For the above reasons, a MIMO-OFDM communication method with improved performance, and which reduces system complexity, has been sought.

Among MIMO-OFDM systems of the prior art, there are systems which accurately predict channel parameters (see Japanese Patent Laid-open No. 2002-44051). Also, in other MIMO-OFDM systems of the prior art, there are decoders which combine ZF and MLD to simplify computation processing (see Japanese Patent Laid-open No. Tokuhyo 2006-509396). And, in still other MIMO-OFDM systems of the prior art, there are some which simplify computation processing when using VBLAST (see Japanese Patent Laid-open No. 2003-244103). However, these systems of the prior art are not systems which use a ZF algorithm or MMSE algorithm to reduce the complexity of MIMO decoding while improving performance.

SUMMARY OF THE INVENTION

Hence an object of the invention is to improve error rate performance even when a ZF algorithm or MMSE algorithm is used for MIMO decoding processing on the receiving side.

A further object of the invention is to improve the error rate performance in MIMO-OFDM communication (spatial multiplexing precoding method, eigen-mode transfer precoding method, limited feedback precoding method) using simple signal processing.

A further object of the invention is to improve the error rate performance even when adaptive modulation control and power control are not performed on the transmitting side.

A further object of the invention is to improve the error rate performance in the hybrid STBC special multiplexing OFDM system or hybrid SFBC special multiplexing OFDM system.

A further object of the invention is to improve the performance of the data retransmission.

MIMO-OFDM Communication Method

A first MIMO-OFDM communication method of the invention has, on the transmitting side, a step of performing precoding processing of transmission data using a prescribed precoding method, and a step of OFDM-modulating the precoding-processed data and transmitting the data from a plurality of transmission antennas; and, has on the receiving side, a step of performing MIMO decoding according to either a ZF algorithm or an MMSE algorithm of reception signals received by a plurality of reception antennas, and outputting a transmission data stream, a step of calculating a weighting coefficient according to the precoding method, and a step of performing weighted decoding processing of the transmission data obtained from the decoding processing by multiplying path metric of the docoding processing by the weighting coefficient.

A second MIMO-OFDM communication method of the invention has, on the transmitting side, a step of performing space-time block coding (STBC) processing or space-frequency block coding (SFBC) processing of transmission data and mapping the result to a plurality of transmission antennas; and a step of performing OFDM modulation of each of the transmission data streams mapped by the coding processing, and transmitting the modulated transmission data streams from the transmission antennas; and, comprising on the receiving side, a step of estimating a channel response matrix having as elements the channel responses from each of the transmission antennas of the transmission device to each of the reception antennas, and of performing prescribed conversion of the channel response matrix; a step of using the channel matrix obtained from the conversion to perform MIMO decoding processing of the reception signals according to a ZF decoding algorithm or an MMSE decoding algorithm, and outputting the transmission data streams, a step of using the channel matrix to calculate signal-to-noise ratio SINR of the data streams as weighting coefficients; and a step of performing weighted decoding processing of the transmission data obtained by the MIMO decoding processing, by multiplying path metric of the decoding processing by the weighting coefficients.

MIMO-OFDM Reception Device

A MIMO-OFDM reception device of the invention comprises a plurality of reception antennas, which receive signals transmitted from a plurality of antennas; a MIMO processing portion, which performs decoding processing of the received signals according to a ZF decoding algorithm or an MMSE decoding algorithm, and outputs a transmission data stream; a weighting coefficient calculation portion, which calculates a weighting coefficient according to the precoding method on the transmitting side; and, a decoding portion, which performs weighted decoding processing of the transmission data obtained by the MIMO decoding processing, by multiplying path metric of the decoding processing by the weighting coefficient.

In the MIMO-OFDM reception device, the reception device further comprises a channel estimation portion, which performs channel estimation from reception signals received by a plurality of reception antennas, and a precoding matrix decision portion, which decides the precoding matrix used in precoding processing on the transmission side based on the channel if the precoding method on the transmitting side is the limited feedback precoding method. The MIMO processing portion uses the precording matrix and the channel to perform the MIMO decoding processing of the reception signals according to the ZF decoding algorithm or MMSE decoding algorithm and outputs a transmission data stream, and the weighting coefficient calculation portion uses the precoding matrix and the channel to calculate the signal-to-noise ratio SINR for the data stream, and uses the signal-to-noise ratio SINR as the weighting coefficient.

MIMO-OFDM Communication System

In a MIMO-OFDM communication system of the invention, a transmission device comprises one FEC encoder which performs encoding processing of a transmission data stream, a puncture portion which performs puncture processing based on the coding rate of the encoded transmission data stream, a frequency interleaver which performs frequency interleaving of the transmission data stream which has been subjected to puncture processing, a constellation mapping portion which performs constellation mapping processing of the transmission data stream after frequency interleaving, a spatial interleaver, provided in a later stage than the puncture portion or the frequency interleaver or the constellation mapping portion, which divides the transmission data stream into a plurality of transmission data streams, a precoder which performs precoding processing of each of the transmission data streams, an OFDM conversion portion which performs OFDM conversion of each of the transmission data streams, and a plurality of transmission antennas which transmit each of the OFDM-converted transmission data streams; and, a reception device comprises a plurality of reception antennas which receive signals transmitted from a plurality of antennas, a MIMO processing portion which performs decoding processing of the received signals according to a ZF decoding algorithm or an MMSE decoding algorithm and separates the result into a plurality of transmission data streams for output, a weighting coefficient calculation portion which calculates a weighting coefficient according to the precoding method on the transmitting side, a processing portion which performs demapping, frequency deinterleaving, spatial deinterleaving, and depuncture processing of the plurality of data streams in the reverse order of the transmitting side, and a decoding portion which performs weighted decoding processing of the input data stream by multiplying path metric of the decoding processing by the weighting coefficient.

MIMO-OFDM Communication Device

A MIMO-OFDM communication device of the invention has a coding portion, which performs space-time block coding (STBC) processing or space-frequency block coding (SFBC) processing of transmission data, and maps the result to a plurality of transmission antennas, an OFDM transmission portion which performs OFDM modulation of each of the transmission data streams mapped in the coding processing and transmits the transmission data streams from the transmission antenna, a channel acquisition portion which estimates a channel response matrix having as elements the channel responses from the transmission antennas of the transmission device to the reception antennas, and performs prescribed conversion into a channel response matrix, a MIMO processing portion which uses the channel matrix acquired by the channel acquisition portion to perform MIMO decoding processing of reception signals received by the plurality of reception antennas according to a ZF decoding algorithm or an MMSE decoding algorithm, a weighting coefficient calculation portion which uses the channel matrix to calculate a signal-to-noise ratio SINR of the data streams as weighting coefficients; and a decoding portion which performs weighted decoding processing of the transmission data streams obtained in the MIMO decoding processing by multiplying path metric of the decoding processing by the weighting coefficient.

BRIEF DESCRIPTION OF THE DRAWINGS

FIG. 2 explains spatial interleaving in a case where s=1, $N_s$=3;
FIG. 4 is a simulation result example showing error rates versus SNR;
FIG. 9 explains spatial interleaving processing;
FIG. 13 explains STBC encoding processing to map two data streams to four antennas;
FIG. 14 explains STBC encoding processing to map two data streams to three antennas.

DESCRIPTION OF THE PREFERRED EMBODIMENTS (A) Summary of the Invention

Novel weighted Viterbi decoding technology suitable for application in reception processing of a MIMO-OFDM communication system is proposed. The reception device of a MIMO-OFDM communication system calculates the SINR (Signal to Interference Noise Ratio) of a MIMO decoding channel, regards the calculated SINR value as the signal reliability, and uses the SINR as the weighting coefficient of the path metric in Viterbi decoding. By means of this method, the error rate of reception data can be reduced through simple signal processing without performing adaptive modulation control or power control, that is, through simple signal processing using a low-complexity ZF decoding algorithm or MMSE decoding algorithm.

(B) First Embodiment
(B-1) Overall Operation

Figure 1:
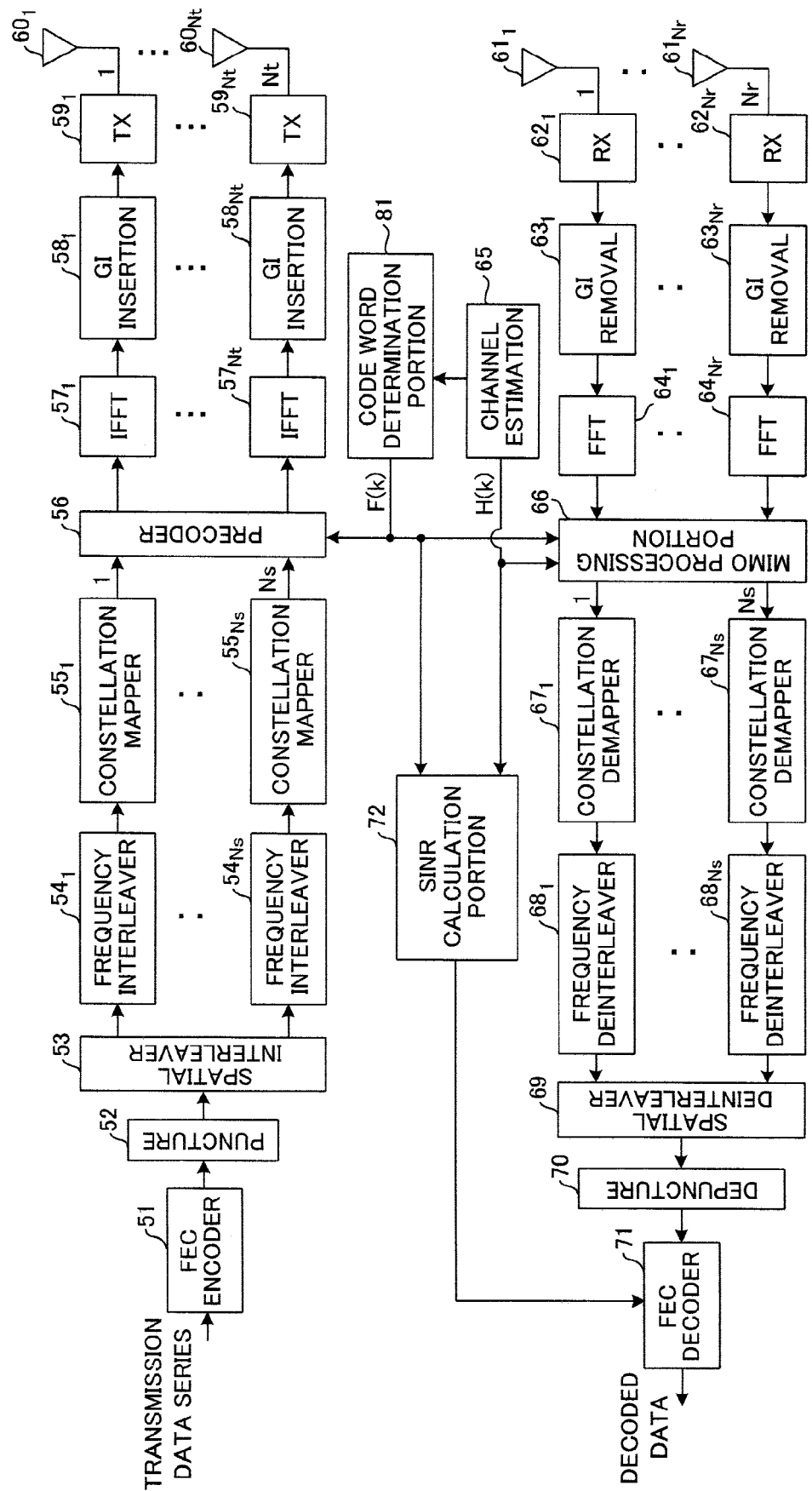
FIG. 1 shows the configuration of the MIMO-OFDM transmission/reception system of a first embodiment.

FIG. 1 shows the configuration of the MIMO-OFDM communication system of a first embodiment. The transmitting side has $N_t$ transmission antennas, the receiving side has $N_r$ reception antennas, and the number of transmission data streams is $N_s$, where $N_s \leq \min\{N_r, N_t\}$.

On the transmitting side, the FEC encoder 51 employs convolution encoding to perform error detection and correction encoding processing of an input data stream, the puncture portion 52 performs puncture processing of the encoded data series according to the coding rate, and the spatial interleaver 53 divides the puncture-processed data bit series into a plurality of data streams, which are $N_s$ data streams in the figure. Specifically, the spatial interleaver 53 periodically sends s bit continuous blocks to different data streams in turn. Here, s may be chosen from the following three options.
1) s=1
2) s=max($N_{BPSC}$/2,1)
3) s=$N_{BPSC}$ Here $N_{BPSC}$ is the number of coded bits per subcarrier. For example, in a case where the above 3) is adopted, if data modulation employs BPSK modulation then s=1, if QPSK modulation is used then s=2, and if 16QAM modulation is used then s=4. FIG. 2 explains spatial interleaving when s=1 and $N_s$=3.

The frequency interleavers $54_1$ to $54_{Ns}$ perform frequency interleaving in which the positions of the input serial data (subcarrier signal components) are interchanged. The constellation mappers $55_1$ to $55_{Ns}$ perform constellation mapping of each of the signal components for the number of subcarriers, according to a prescribed data modulation method, for example QPSK modulation.

Then, the precoder 56 multiples each of the $N_s$ data streams by a prescribed precoding matrix, and converts the $N_s$ data streams into $N_t$ data streams. That is, the precoder 56 uses a precoding matrix F(k) to map $N_s$ transmission data streams to $N_t$ transmission antennas.

$$x(k)=F(k)s(k) \quad (5)$$

Here k is the subcarrier index, s(k) is an $N_s \times 1$ transmission data vector, and x(k) is an Nt×1 transmission antenna data vector.

The IFFT portions $57_1$ to $57_{Nt}$ convert the series-input data from the precoder 56 into parallel data for the number of subcarriers, and then perform IFFT (inverse Fourier transform) of this parallel data, combining the data in discrete time signals (OFDM signals), which are output. The guard interval insertion portions $58_1$ to $58_{Nt}$ insert guard intervals into the OFDM signals input from the IFFT portions, and the transmission portions (TX) $59_1$ to $59_{Nt}$ perform DA conversion of the OFDM signals with guard intervals inserted, then convert the frequency of the OFDM signals from baseband to a wireless band, perform high-frequency amplification, and transmit the signals from the antennas $60_1$ to $60_{Nt}$.

Signals transmitted from the transmission antennas $60_a$ to $60_{Nt}$ pass through fading channels (propagation paths) and are received by the reception antennas $61_1$ to $61_{Nr}$ of the reception device; the reception circuits (Rx) $62_1$ to $62_{Nr}$ convert the RF signals received by the antennas into baseband signals, perform AD conversion of the baseband signals into digital signals, and output the signals. The symbol extraction portions $63_1$ to $63_{Nr}$ delete the guard intervals GI, extract OFDM symbols with FFT timing, and input the signals to the FFT portions $64_1$ to $64_{Nr}$. The FFT portions $64_1$ to $64_{Nr}$ perform FFT processing for each OFDM symbol extracted, converting the symbols into frequency-domain subcarrier samples.

The channel estimation circuit 65 performs channel estimation for each subcarrier using a well-known method, and the code word determination portion 81 determines the code word corresponding to the optimum precoding matrix F(k) from a code book, and notifies the transmitting-side precoder 56 of the index number. By this means, the precoder 56 uses the same code book as on the receiving side to determine the precoding matrix F(k), and performs the computation of equation (5). The channel estimation portion 65 inputs the channel matrix H(k) for each estimated subcarrier into the MIMO processing portion 66 and SINR calculation portion 72.

Frequency domain signals y(k) output from the FFT portions $64_1$ to $64_{Nr}$ can be represented by the following equation.

$$y(k)=H(K)F(k)s(k)+n(k) \quad (6)$$

Here H(k) is the kth subcarrier channel matrix, n(k) represents an $N_r \times 1$ noise vector, y(k) represents an $N_r \times 1$ reception signal vector, and the signals from each reception antenna are superpositions of transmission signals. y(k), H(k) and F(k) are known from measurements in the receiver. In order to obtain the transmission signals $$\hat{s}(k)$$

the MIMO processing portion 66 can use an MLD algorithm, but the degree of complexity becomes enormous. Hence a linear decoder represented by the following equation, with low degree of complexity, is adopted.

$$\hat{s}(k)=G(k)y(k) \quad (7)$$

Here G(k) is an Ns×Nr matrix. When using a ZF (Zero Forcing) linear decoder, G(k) is represented by the following equation:

$$G(k)=(H(k)F(k))^+ \quad (8)$$

Here $(.)^+$ indicates the pseudo-inverse matrix.

On the other hand, when using an MMSE (Minimum Mean Square Error) linear decoder, G(k) is represented by the equation $$G(k) = \left[ F'(k)H'(k)H(k)F(k) + \left(N_s \frac{N_0}{\varepsilon_s}\right) I_{Ns} \right]^{-1} F'(k)H'(k) \quad (9)$$

where $(.)^{-1}$ indicates the inverted matrix, and $(\ )'$ indicates the complex conjugate transpose. Also, No is the noise power received by antennas, $\varepsilon_s$ is the total transmission power of the kth subcarrier, and $I_{Ns}$ is the Ns×Ns identity matrix.

The SINR calculation portion 72 uses the channel matrix H(k) and precoding matrix F(k) to calculate the $SINR_i(k)$ and input the result to the decoding portion 71, as described below.

The constellation demappers $67_1$ to $67_{Ns}$, frequency deinterleavers $68_1$ to $68_{Ns}$, spatial deinterleaver 69, depuncture portion 70, and decoding portion 71 perform, in the order opposite that on the transmitting side, demapping, frequency deinterleaving, spatial deinterleaving, and decoding processing (weighted error correcting/decoding processing) of each of the data streams $$\hat{s}(k)$$

separated using equation (7). The decoding portion 71 takes the input SINR to be the signal reliability, and imparts weighting by multiplying the Viterbi decoding path metric by this SINR, to execute weighted error correcting/decoding processing.

(B-2) Precoding Method

Methods to determine the precoding matrix F(k) include (1) a limited feedback precoding method, (2) eigen-mode transfer precoding method, and (3) spatial multiplexing precoding method. If the channel H(k) is unknown, the precoder 56 employs a spatial multiplexing precoding method, using the identity matrix as the precoding matrix F(k) to compute equation (5) and perform space-division multiplexed transfer. If the channels H(k) are known on the transmitting side and on the receiving side, the precoder 56 adopts an eigen-mode transfer precoding method, performs singular value decomposition (SVD) of the channel matrix H(k), takes the decomposed right singular matrix to be the precoding matrix F(k), and performs the computation of equation (5). If an index identifying the precoding matrix F(k) based on the channel H(k) is determined and is fed back from the receiving side, then a limited feedback precoding method is adopted, and the precoder 56 determines the precoding matrix F(k) according to the index and performs the computation of equation (5). Below, each of these systems is described in detail.

(a) Limited Feedback Precoding Method

The principle of the limited feedback precoding method is explained. A code book is created in advance, based on a number of data streams $N_s$, number of transmission channels $N_t$, and number of feedback bits (L), and it is assumed that the transmitter and receiver have the same code book.

The code word determination portion 81 of the receiver uses the channel H(k) to select the optimum code word from the code book, and uses a limited feedback channel to feed back the index of the code word to the transmitter. The transmitter uses the fed-back index to select the precoding matrix F(k) from the code book, and multiplies the transmission data streams by this matrix F(k) to perform precoding. The code book is a set of predetermined unitary matrices, and a code word defines one unitary matrix in the code book. If U is a unitary matrix, then the equation $$U'U=I$$

is satisfied. The limited feedback precoding method is described in the paper "Limited Feedback Unitary Precoding for Spatial Multiplexing Systems" by David J. Love and Robert W. Heath Jr., IEEE Transactions on Information Theory, Vol. 51, No. 8, August 2005, pp. 2967-2976.

The following is the detailed order of operation of the limited feedback precoding method.

(1) First, the code word determination portion 81 of the receiver selects a code word. This code word selection is performed as follows. In the channel estimation portion 65, channel estimation is performed, to determine a channel H(k). Then, the code word determination portion 81 uses the channel H(k) thus determined to select the optimum code word, according to the following criteria (1-1) through (1-3).

(1-1) MMSE (Minimum Mean Square Error) Selection Criterion

The MSE (mean square error) of the receiver can be represented as follows, if H(k) and F(k) are known.

$$MSE(F(k)) = \frac{\varepsilon_s}{N_s}\left(I_{Ns} + \frac{\varepsilon_s}{N_s N_0}F'(k)H'(k)H(k)F(k)\right)^{-1} \quad (10)$$

The code word is selected from the code book, based on the following equations, so as to minimize MSE Trace (tr) or Determinant (det):

$$F(k) = \arg\min_{F_j \in F} tr[MSE(F_j)] \quad (11a)$$

$$F(k) = \arg\min_{F_j \in F} \det[MSE(F_j)] \quad (11b)$$

Here Trace (tr) is the sum of the diagonal elements of the matrix.

In place of the above equations, the code word can be determined using the following simplified equations.

$$F(k) = \underset{F_j \in F}{\arg\min}(tr[F'(k)H'(k)H(k)F(k)]^{-1}) \quad (12a)$$

$$F(k) = \underset{F_j \in F}{\arg\min}(\det[F'(k)H'(k)H(k)F(k)]^{-1}) \quad (12b)$$
$$= \underset{F_j \in F}{\arg\max}(\det[F'(k)H'(k)H(k)H(k)])$$

(1-2) Capacity Selection Criterion

The code word determination portion 81 can select a code word from the code book using the following equation, such that the capacity, or in other words, the amount of information communicated per prescribed time, is maximized.

$$F(k) = \arg\max_{F_j \in F}\left(\log_2\det\left[\begin{pmatrix}I_{Ns} + \frac{\varepsilon_s}{N_s N_0}\\F'(k)H'(k)H(k)H\end{pmatrix}k\right]\right) \quad (13)$$

Or, the following simplified equation can also be used.

$$F(k) = \arg\max_{F_j \in F}(\det[F'(k)H'(k)H(k)H(k)]) \quad (14)$$

It should be noted that in principle, from equations (12b) and (14), the maximum-capacity selection criterion and the minimum Det(MSE) criterion are equivalent.

(1-3) Singular Value Selection Criterion

The code word determination portion 81 selects a code word from the code book using the following equation, so as to maximize the minimum singular value.

$$F(k) = \arg\max_{F_j \in F}\lambda_{min}\{H(k)F_j(k)\} \quad (15)$$

Equation (15) means that the matrix H(k)Fj(k) is determined for each of the candidates Fj(k) for code words in the code book, singular value decomposition of the matrix {H(k)Fj(k)} is performed to determine the minimum singular value $\lambda_{min}$, and the candidate Fj(k) resulting in the largest minimum singular value among all the minimum singular values is used.

In the above, a case was explained in which a code word is determined using singular value decomposition; but the code word can be similarly determined using eigenvalue decomposition as well.

(2) When the code word is determined, the code word determination portion 81 feeds back the index of the code word to the precoder 56 of the transmitter. That is, the receiver transfers to the transmitter, via a limited feedback channel, the index (L bits) of the selected optimum code word.

(3) The precoder 56 of the transmitter, upon receiving the index, references the internal code book and selects the matrix corresponding to the received index. Then, the precoder 56 uses this selected matrix as a MIMO precoding matrix.

(4) The MIMO processing portion 66 of the receiver uses a ZF (Zero Forcing) linear decoder or an MMSE (Minimum Mean Square Error) linear decoder to separate the transmission signals, $\hat{s}(k)$ in parallel with the above code word selection processing.

(5) Or, the SINR calculation portion 72 calculates the SINR to be used as weighting for the path metric in Viterbi decoding processing.

(5-1) SINR Calculation When Using a ZF Decoder

When a ZF decoder (ZF decoding algorithm) is used for transmission signal separation, the SINR calculation portion 72 calculates the SINR values for each subcarrier using the following equation and inputs the calculation results to the decoding portion 71.

$$SINR_i^{(ZF)}(k) = \frac{\varepsilon_s}{N_s N_0 \left[\left(\frac{F'(k)H'(k)}{H(k)F(k)}\right)^{-1}\right]_{i,i}} \propto \frac{1}{\left[\left(\frac{F'(k)H'(k)}{H(k)F(k)}\right)^{-1}\right]_{i,i}} \quad (16)$$

Here i is an index for data streams. Also, $[*]_{i,i}$ is the element in the ith row and ith column of a matrix.

The decoding portion 71 weights the Viterbi path metric by the calculated SINR values as indicated by the following equation.

Viterbi path metric:

$$P_{i,n} = SINR_i^{(ZF)}(k)|\hat{b}_{i,n}^{(ZF)}(k) - b_{i,n}^{(ZF)}(k)|^2 \quad (17)$$

Here i is an index for data streams, and n is an index for demapped bits. For example, in the case of 16QAM modulation, demapped bits are the four bits b1 to b4, so that n=1 means b1, n=2 means b2, n=3 means b3 and n=4 means b4. Moreover, $\hat{b}_{i,n}^{(ZF)}(k)$ is a soft decision value, and $b_{i,n}^{(ZF)}(k)$ is a reference value In this way, by weighting the Viterbi path metric using SINR values, increases in noise due to the ZF decoding algorithm are reduced, and performance can be improved.

(5-2) SINR Calculation When Using an MMSE Decoder

The above was a case when a ZF decoder is used; when an MMSE decoder (MMSE decoding algorithm) is used in transmission signal separation, the SINR calculation portion 72 uses the following equation to calculate the SINR for each subcarrier, and inputs the results to the decoding portion 71.

$$SINR_i^{(MMSE)}(k) = \frac{\varepsilon_s}{N_s N_0 \left[\left(F'(k)H'(k)H(k)F(k) + (N_s N_0/\varepsilon_s)I_{N_s}\right)^{-1}\right]_{i,i}} - 1 \quad (18)$$

The decoding portion 71 uses the calculated SINR values to weight the Viterbi path metric according to the following equation.

Viterbi path metric:

$$P_{i,n} = SINR_i^{(MMSE)}(k) |\hat{b}_{i,n}^{(MMSE)}(k) - b_{i,n}^{(MMSE)}(k)|^2 \quad (19)$$

By using the SINR values to weight the Viterbi path metric as described above, increases in noise due to the MMSE decoding algorithm can be reduced, and performance can be improved.

The values calculated using equation (16) for $$SINR_i^{(ZF)}(k)$$

can be used to weight MMSE decoded signals. Conversely, ZF-decoded signals can be weighted using the value of $$SINR_i^{(MMSE)}(k)$$

calculated in equation (18).

In order to reduce the degree of complexity, when the SINR is lower than a threshold value the SINR can be set to 0, and when the SINR is equal to or greater than the threshold value, the SINR can be set to 1.

(5-3) Effect of Weighting the Viterbi Path Metric

Substitution of equation (6) into equation (7) yields the following equation.

$$\hat{s}(k) = G(k)y(k) = G(k)(H(k)F(k)s(k) + n(k)) = G(k)H(k)F(k)s(k) + G(k)n(k) \quad (20)$$

For the linear decoders ZF and MMSE, the second term G(k)n(k) in the above equation is a noise increase. When G(k)n(k) is large, the noise in the decoded signal is increased markedly, and the performance of the linear decoder is degraded. Particularly in the case of a frequency-selective MIMO channel, this problem is serious. In this invention, by weighting the Viterbi path metric with the SINR value, this noise increase can be reduced. That is, in this invention the SINR is calculated for each of the data streams and each subcarrier, and the SINR value is adopted as the reliability of demodulated signals to perform weighted Viterbi decoding, as in equations (17) and (19). As a result, when the SINR is small (when the noise increase is large), the contribution of the Viterbi path metric is reduced, and conversely, when the SINR is large (when the noise increase is small), the contribution of the Viterbi path metric is increased, so that as a result the performance can be improved.

(b) Eigen-Mode Transfer Precoding Method

The eigen-mode transfer precoding method can be adopted when the channel state information CSI (channels H(k)) at the transmitter and receiver are known. In the eigen-mode transfer precoding method, the channel matrix H(k) is subjected to singular value decomposition (SVD), and the matrix obtained from this analysis is used as the precoding matrix, to construct a high-performance system.

That is, for a subcarrier k, the channel matrix H(k) is an Nr×Nt matrix. Singular value decomposition of H(k) can be represented as follows.

$$H(k) = U(k)D(k)V'(k) \quad (21a)$$

$$D(k) = \text{diag}(\sqrt{\lambda_1(k)}, \sqrt{\lambda_2(k)}, \ldots, \sqrt{\lambda_m(k)}, 0, \ldots, 0) \quad (21b)$$

U(k) in equation (21a) is the left singular matrix, and V(k) is called the right singular matrix. D(k) is a diagonal matrix, and has the diagonal elements indicated in equation (21b). $\lambda_1(k), \ldots, \lambda_m(k)$ are proportional to the eigen-mode gain, and are arranged in order of magnitude, with the first eigen-mode $\lambda_1(k)$ having the largest gain, and the mth eigen-mode $\lambda_m(k)$ having the smallest gain. That is, $\lambda_1(k) > \lambda_2(k) > \ldots > \lambda_m(k)$. m is the rank of the channel H(k). The optimal precoding matrix is the Ns columns on the left side of the right singular matrix V(k).

From the above analysis, in an ideal case, that is, when the channel state information CSI (channel H(k)) is known at the transmitter and the receiver, and moreover the two completely coincide, the eigenvalues $\lambda_i(k)$ are taken to be the weighting of the path metric in Viterbi decoding, as indicated by the following equation. That is, the decoding portion 71 takes the above eigenvalues $\lambda_i(k)$ to be the path metric weight, which is multiplied by the path metric to perform decoding, and by this means noise increases due to the ZF decoding algorithm and MMSE decoding algorithm can be reduced, and performance can be improved.

$$P_{i,n} = \lambda_i(k) |\hat{b}_{i,n}(k) - b_{i,n}(k)|^2 \quad (22)$$

When realizing the eigen-mode transfer precoding method, there exist numerous problems, for example relating to channel quantization errors and changes with time in the channel, and in many cases the realization of the eigen-mode transfer precoding method is difficult. In such cases, it is more practical to use the limited feedback precoding method to determine the SINR for use in weighting the path metric.

(c) Spatial Multiplexing Precoding Method

The spatial multiplexing precoding method is a method in which, when H(k) is unknown on the transmitting side, the identity matrix is used as the precoding matrix F(k). That is, in the case of the spatial multiplexing precoding method, the precoding matrix F(k) is the identity matrix. Consequently the SINR calculation portion 72 can simply calculate the SINR using the following equation.

$$SINR_i^{(ZF)}(k) = \frac{\varepsilon_s}{N_t N_0 [(H'(k)H(k))^{-1}]_{i,j}} \propto \frac{1}{[(H'(k)H(k))^{-1}]_{i,j}} \quad (23a)$$

$$SINR_i^{(MMSE)}(k) = \frac{\varepsilon_s}{N_t N_0 [(H'(k)H(k) + (N_t N_0/\varepsilon_s)I_{Nt})^{-1}]_{i,j}} - 1 \quad (23b)$$

Here equation (23a) is for the case in which the ZF decoding algorithm is adopted, and equation (23b) is for the case in which the MMSE decoding algorithm is used.

The decoding portion 71 uses the SINR calculated as above as the path metric weight, multiplying by the path metric to perform decoding, that is, performing decoding according to equation (17) or equation (19), and so the noise increase due to the ZF decoding algorithm or to the MMSE decoding algorithm can be reduced, and performance can be improved.

(e) System Switching Control

First Switching Control

Depending on the channel conditions and the capabilities of the communication device, the precoding method can be switched between the limited feedback precoding method, eigen-mode transfer precoding method, and spatial multiplexing precoding method, to perform OFDM-MIMO communication.

Specifically, the channel condition number is calculated for each subcarrier using equation (24), the average value thereof is determined as the channel average condition number, and when the channel average condition number is satisfactory, that is, when the channel average condition number is equal to or less than a certain threshold, the spatial multiplexing precoding method is used, but when the channel average condition number is poor, that is, when the average channel condition number exceeds the threshold, the eigenmode transfer precoding method or the limited feedback precoding method is used, depending on the capabilities of the communication device.

The channel condition number can be calculated using the following equation.

$$\psi(k) = \frac{\lambda_{max}\{H(k)\}}{\lambda_{min}\{H(k)\}} \qquad (24)$$

In the above equation, the numerator is the maximum value of diagonal elements in the diagonal matrix obtained by singular value decomposition of the channel matrix H(k) (the maximum singular value), and the denominator is the minimum value of the diagonal elements (the minimum singular value). The smaller the channel condition number, the more uniform are the channels (propagation characteristics) for each propagation path, and the better the reception state can be. In order to secure reliable communication, in some cases it is also possible to reduce the number of data streams.

In the above, a case was explained in which the channel condition number is calculated by means of singular value decomposition; but the channel condition number can similarly be calculated by eigenvalue decomposition.

Further, the above was a case of switching between the limited feedback precoding method, eigen-mode transfer precoding method, and spatial multiplexing precoding method; but switching can also be between the spatial multiplexing precoding method and the limited feedback precoding method based on the channel average condition number, without using the eigen-mode transfer precoding method.

Further, the precoder can use the spatial multiplexing precoding method when the channel H(k) is an unknown initial value, and switching control can be performed so as to use the limited feedback precoding method when the precoding matrix is determined based on the channel H(k).

Figure 3:
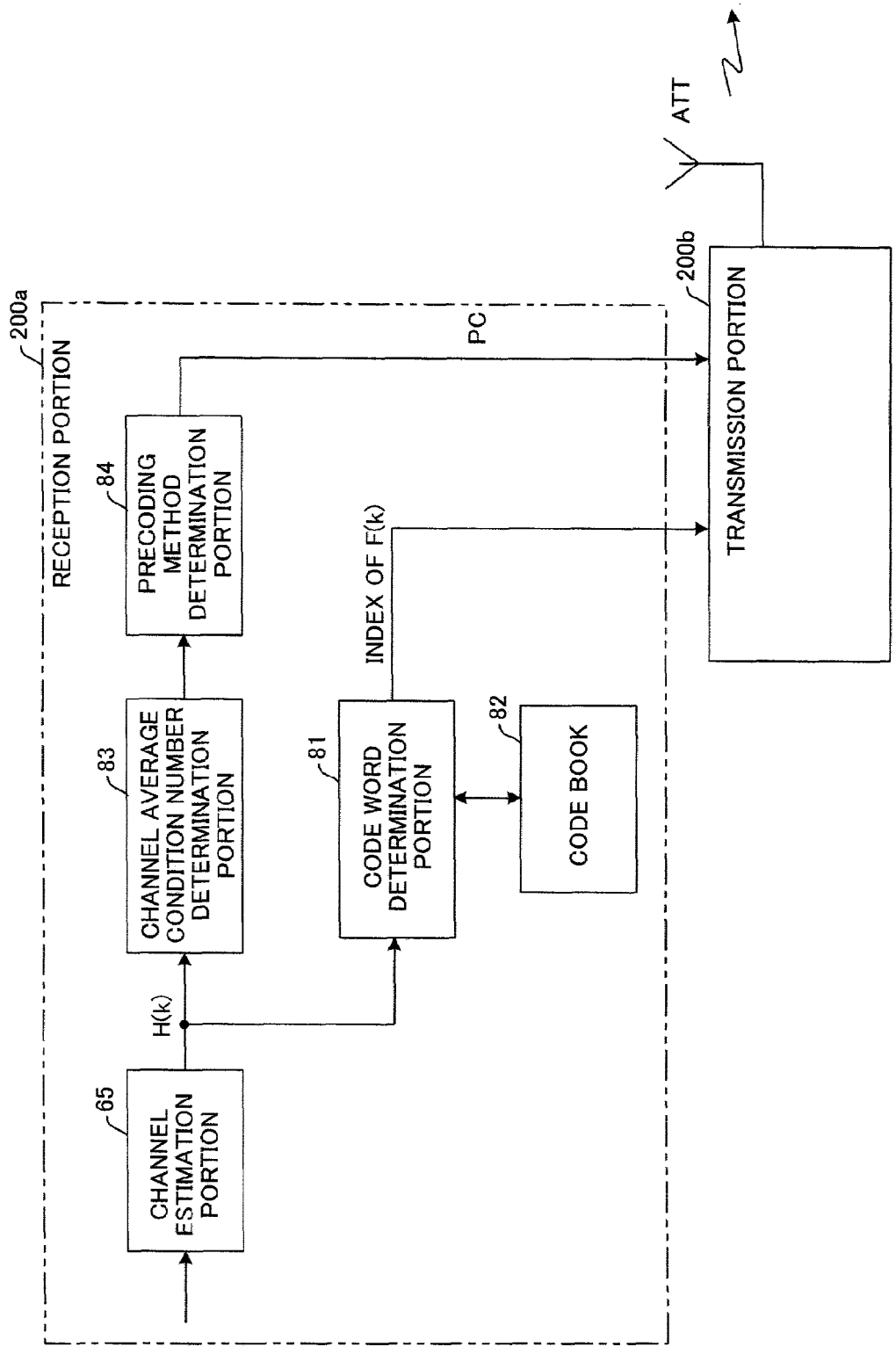
FIG. 3 shows the switching control configuration of a precoding method in a receiver.

FIG. 3 shows the configuration for switching control between precoding methods in a receiver; 200a is a reception portion, and 200b is a transmission portion. In the reception portion 200a are provided, in addition to a channel estimation portion 65, code word determination portion 81, and code book 82, a channel condition number computation portion 83 and precoding method determination portion 84. The channel condition number computation portion 83 computes the channel average condition number based on equation (24), and the precoding method determination portion determines, based on the channel average condition number, whether to use the spatial multiplexing precoding method or the limited feedback precoding method, and transmits precoding command data PC to the precoder 56 of the transmitter via the transmission portion 200b. Based on the indicated precoding method, the precoder 56 determines the precoding matrix and performs the computation of equation (5).

Second Switching Control

The MIMO processing portion 66 can use the ZF decoding algorithm or the MMSE decoding algorithm as the decoding algorithm, but depending on the modulation method, the ZF decoding algorithm and the MMSE decoding algorithm can be used selectively. For example, in the case of BPSK and QPSK, the MMSE decoding algorithm may be used, while for 16QAM and 64QAM the ZF decoding algorithm is used. The reason for this is as follows.

The MMSE decoding algorithm is robust with respect to noise, whereas the ZF decoding algorithm is not as robust with respect to noise as the MMSE decoding algorithm. BPSK and QPSK are modulation methods used when noise is intense, and so when using the BPSK or QPSK modulation method, the MMSE decoding algorithm is used. 16QAM and 64QAM are modulation methods used when the reception quality is good, and so when using the 16QAM or 64QAM modulation method, the ZF decoding algorithm is used.

(B-3) Simulation Results

FIG. 4 shows an example of simulation results indicating the error rate versus the signal-to-noise ratio SNR; the vertical axis shows the packet error rate PER, and the horizontal axis indicates the signal-to-noise ratio (SNR). (A) is the simulation result for a ZF decoder, and (B) is the simulation result for an MMSE decoder; in these cases the modulation method and coding rate are 16QAM and ½. In the case of the spatial multiplexing precoding method, the number of transmission antennas is 2, and the number of reception antennas is 2. In the cases of the eigen-mode transfer precoding method and the limited feedback precoding (LFP) method, the number of transmission data streams, number of transmission antennas, and number of reception antennas are respectively 2, 4, and 2.

SP1 and SP2 are are characteristics of spatial multiplexing precoding methods; SP1 is for a case without weighting, and SP2 is for a case with weighting. LFP1 and LFP2 are limited feedback precoding method characteristics; LFP1 is without weighting, and LFP2 is with weighting. MP1 and MP2 are eigen-mode transfer precoding method characteristics; MP1 is without weighting, and MP2 is with weighting.

As is clear from (A) and (B) of FIG. 4, when performing MIMO processing based on the ZF decoding algorithm or MMSE decoding algorithm, in either case the characteristics are confirmed to be improved for the precoding method when weighting is performed.

Of the three precoding method, the performance is best for the eigen-mode transfer precoding method, followed by the performance of the limited feedback precoding method, with the performance of the spatial multiplexing precoding method in third place.

(B-4) Application to MISO, SIMO, SISO Systems

In the above, cases of use in MIMO (Multiple-Input, Multiple-Output) systems were explained; however, this invention can also be applied to MISO (Multiple-Input, Single-Output) and SIMO (Single-Input, Multiple-Output) systems.

In the case of MISO or SIMO, the SINR can be calculated using the following equation.

$$SINR(k) \propto \sum_i |h_i(k)|^2 \qquad (25)$$

Hence the decoding portion 71 represents the path metric in Viterbi decoding using the following equation to perform decoding processing.

$$P_n = \sum_i |h_i(k)|^2 |\hat{b}_n - b_n|^2 \qquad (26)$$

In the above equation, i is the index of the transmission antenna (for MISO) or of the reception antenna (for SIMO).

This invention can also be applied to SISO (Single-Input, Single-Output) systems. In the case of SISO, the SINR can be calculated using the following equation.

$$SINR(k) \propto |h(k)|^2 \qquad (27)$$

Hence the decoding portion 71 represents the path metric in Viterbi decoding using the following equation to perform decoding processing.

$$P_n = |h(k)|^2 |\hat{b}_n - b_n|^2 \qquad (28)$$

(C) Second Embodiment

Figure 5:
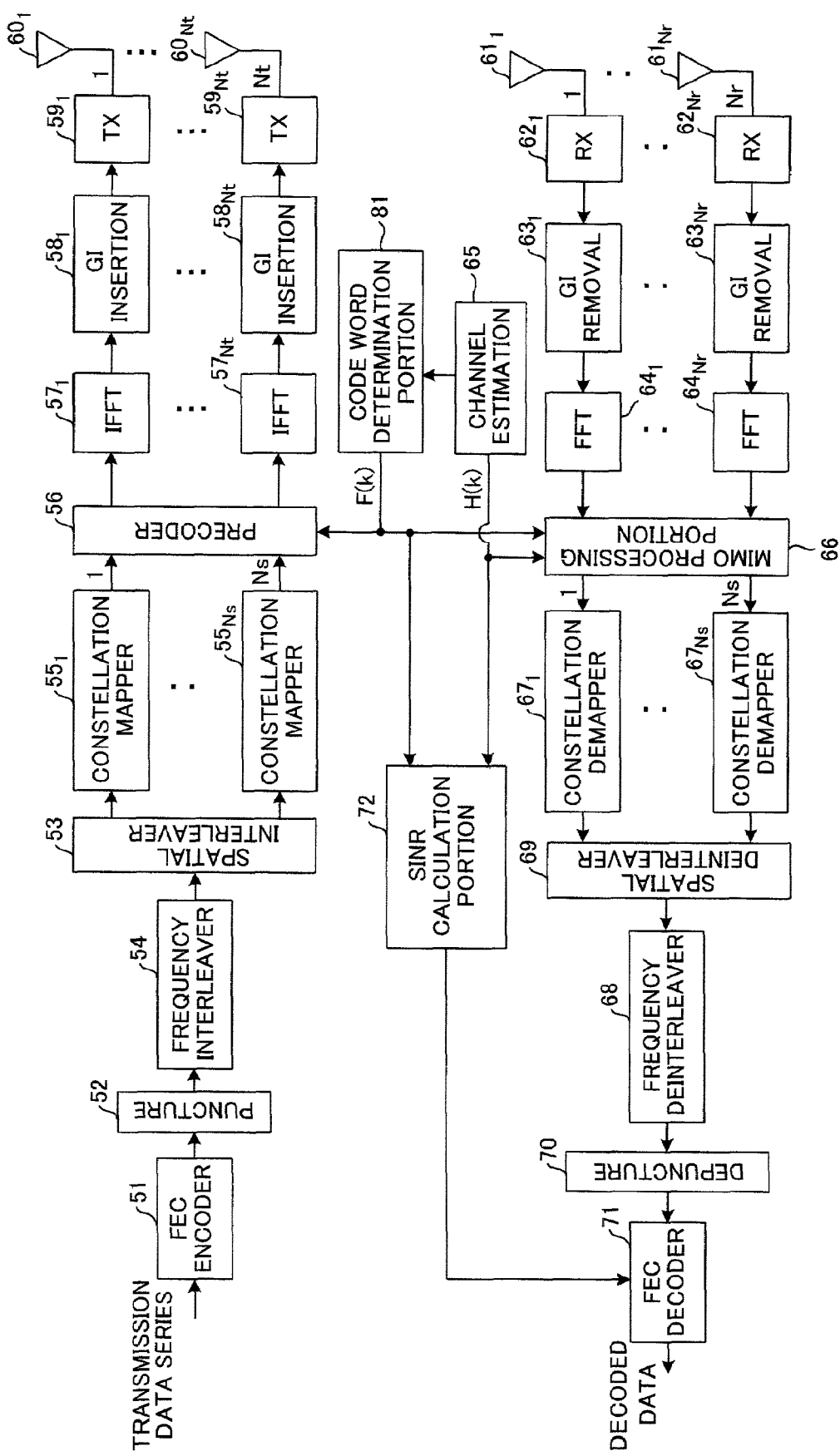
FIG. 5 is a configuration diagram of the MIMO-OFDM transmission/reception system of a second embodiment.

FIG. 5 shows the configuration of the MIMO-OFDM transmission/reception system of a second embodiment; portions which are the same as in the first embodiment of FIG. 1 are assigned the same symbols. A difference with the first embodiment is the fact that frequency interleaving is performed before spatial interleaving.

The transmitting side comprises one each of an FEC encoder 51, puncture portion 52, and frequency interleaver 54. In order to utilize spatial diversity, the spatial interleaver 53 divides the frequency-interleaved data bits into Ns data streams, which are input to the constellation mappers $55_1$ to $55_{Ns}$. The constellation mappers $55_1$ to $55_{Ns}$ perform constellation mapping, and the precoder 56 performs precoding according to a prescribed method. The subsequent procedure is the same as in the first embodiment.

On the receiving side, the MIMO processing portion 66 separates the data streams according to the MMSE decoding algorithm or the ZF decoding algorithm, and thereafter, constellation demapping, spatial deinterleaving, frequency deinterleaving, depuncture processing, and decoding processing (weighted error-correcting/decoding processing) are performed, in the order opposite that on the transmitting side.

In the second embodiment, the circuit scale of the frequency interleaver 54 can be reduced, and moreover spatial diversity can be utilized.

(D) Third Embodiment

Figure 6:
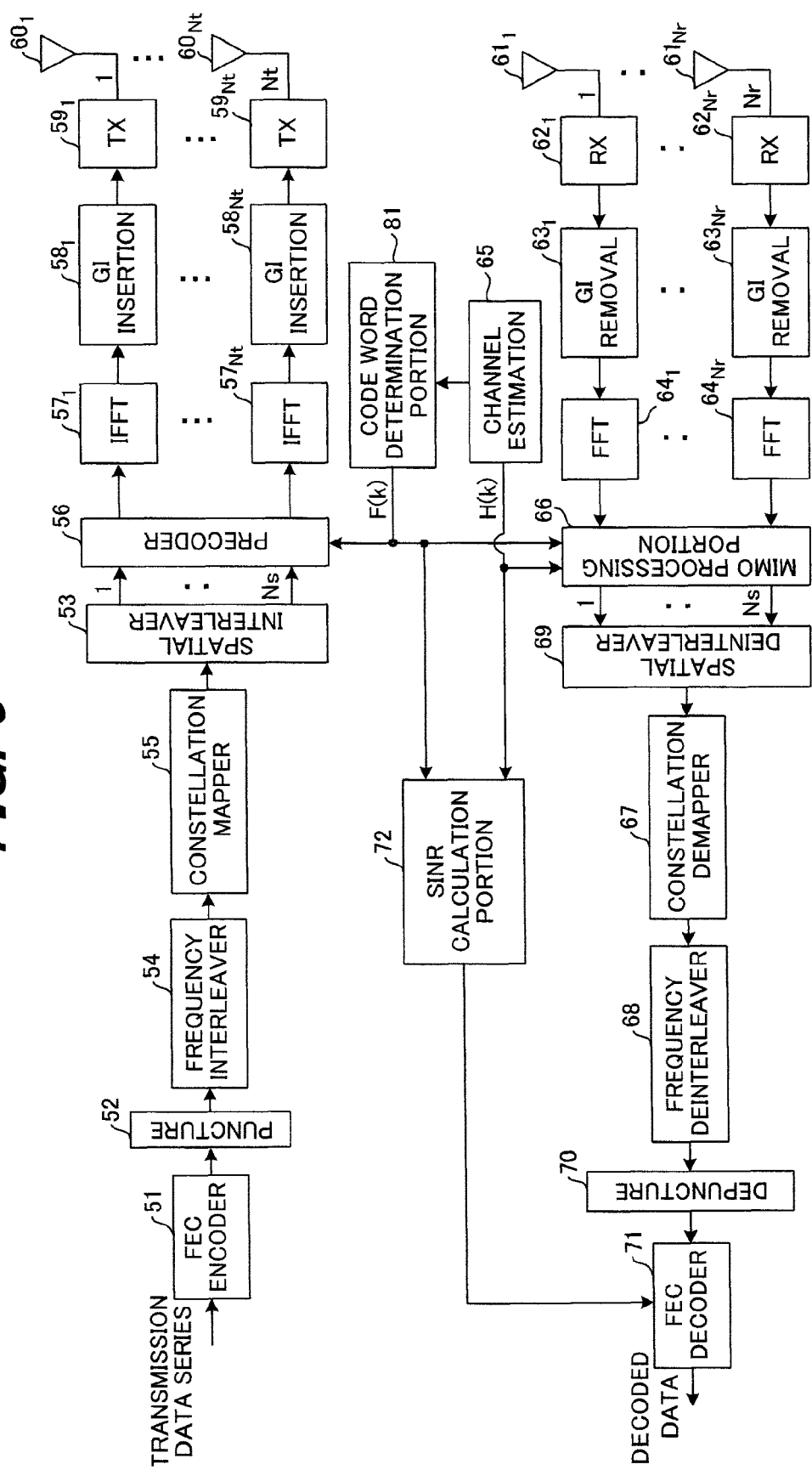
FIG. 6 is a configuration diagram of the MIMO-OFDM transmission/reception system of a third embodiment.

FIG. 6 shows the configuration of the MIMO-OFDM transmission/reception system of a third embodiment; portions which are the same as in the first embodiment of FIG. 1 are assigned the same symbols. A difference with the first embodiment is the fact that before performing spatial interleaving, frequency interleaving and constellation mapping are performed.

The transmitting side comprises one each of an FEC encoder 51, puncture portion 52, frequency interleaver 54, and constellation mapper 55. In order to utilize spatial diversity, the spatial interleaver 53 divides the constellation-mapped data bits into Ns data streams, which are input to the precoder 56, and the precoder 56 performs precoding according to a prescribed method. The subsequent procedure is the same as in the first embodiment.

On the receiving side, the MIMO processing portion 66 separates the data streams according to the MMSE decoding algorithm or the ZF decoding algorithm, and thereafter, spatial deinterleaving, constellation demapping, frequency deinterleaving, depuncture processing, and decoding processing (weighted error-correcting/decoding processing) are performed, in the order opposite that on the transmitting side.

In the third embodiment, the circuit scale of the frequency interleaver 54 and constellation mapper 55 can be reduced, and moreover spatial diversity can be utilized.

(E) Fourth Embodiment

Figure 7:
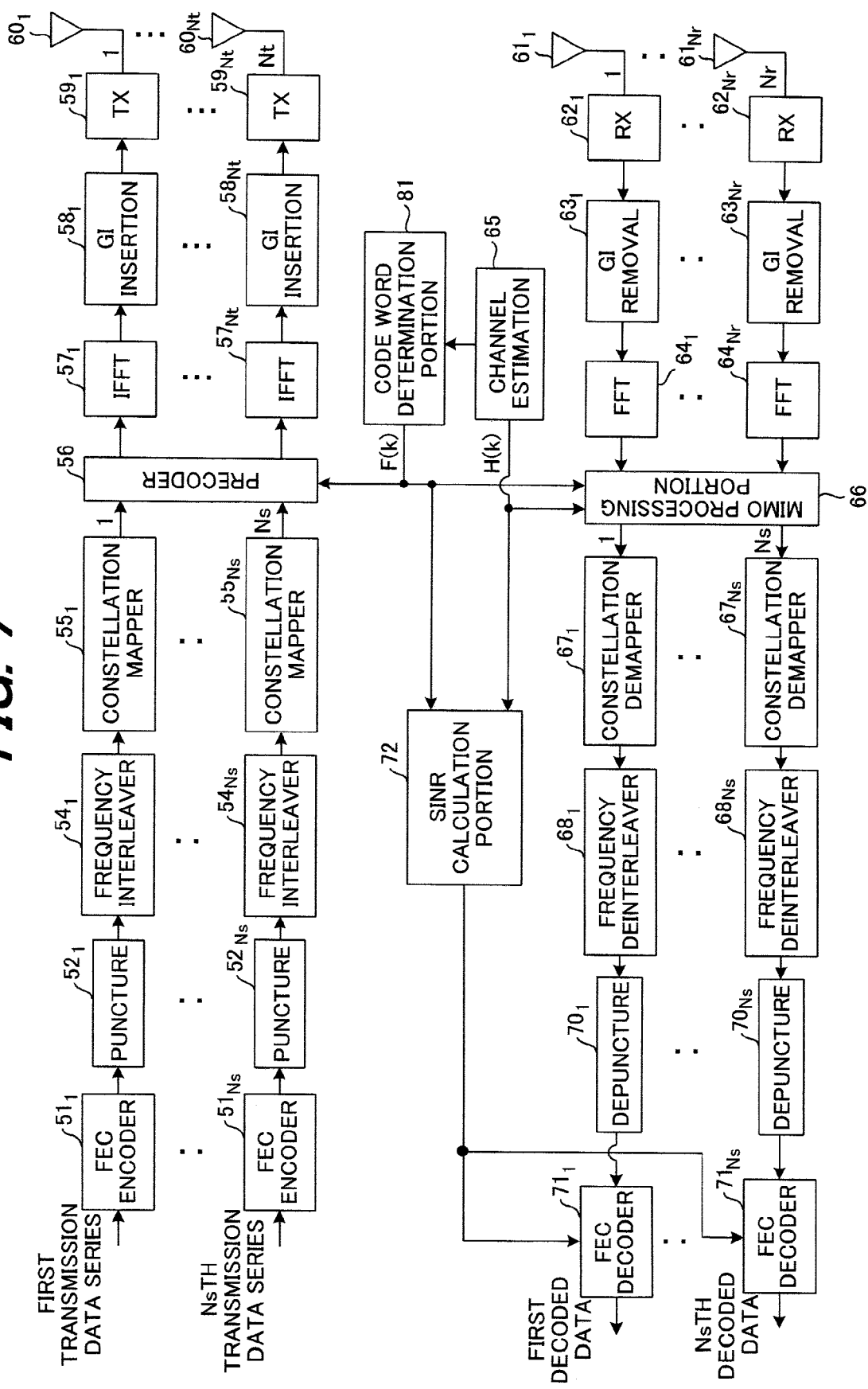
FIG. 7 is a configuration diagram of the MIMO-OFDM transmission/reception system of a fourth embodiment.

FIG. 7 shows the configuration of the MIMO-OFDM transmission/reception system of a fourth embodiment; portions which are the same as in the first embodiment of FIG. 1 are assigned the same symbols. A difference with the first embodiment is the fact that Ns transmission data streams are input, there are provided, corresponding to each of the transmission data streams, FEC encoders $51_1$ to $51_{Ns}$, puncture portions $52_1$ to $52_{Ns}$, frequency interleavers $54_1$ to $54_{Ns}$, and constellation mappers $55_1$ to $55_{Ns}$, and there exists no spatial interleaver.

The precoder 56 performs precoding, according to a prescribed method, of constellation-mapped signals. Subsequent processing is the same as in the first embodiment.

On the receiving side, the MIMO processing portion 66 separates data streams according to the MMSE decoding algorithm or the ZF decoding algorithm, and thereafter, for each of the separated data streams, constellation demapping, frequency deinterleaving, depuncture processing, and decoding processing (weighted error-correcting/decoding processing) are performed, in the order opposite that on the transmitting side.

In the fourth embodiment, each of the data streams can be processed in parallel, so that the circuit operating frequency can be lowered. However, spatial diversity cannot be utilized, so that there is some degradation of performance, particularly when using the eigen-mode transfer precoding method.

(F) Fifth Embodiment

Figure 8:
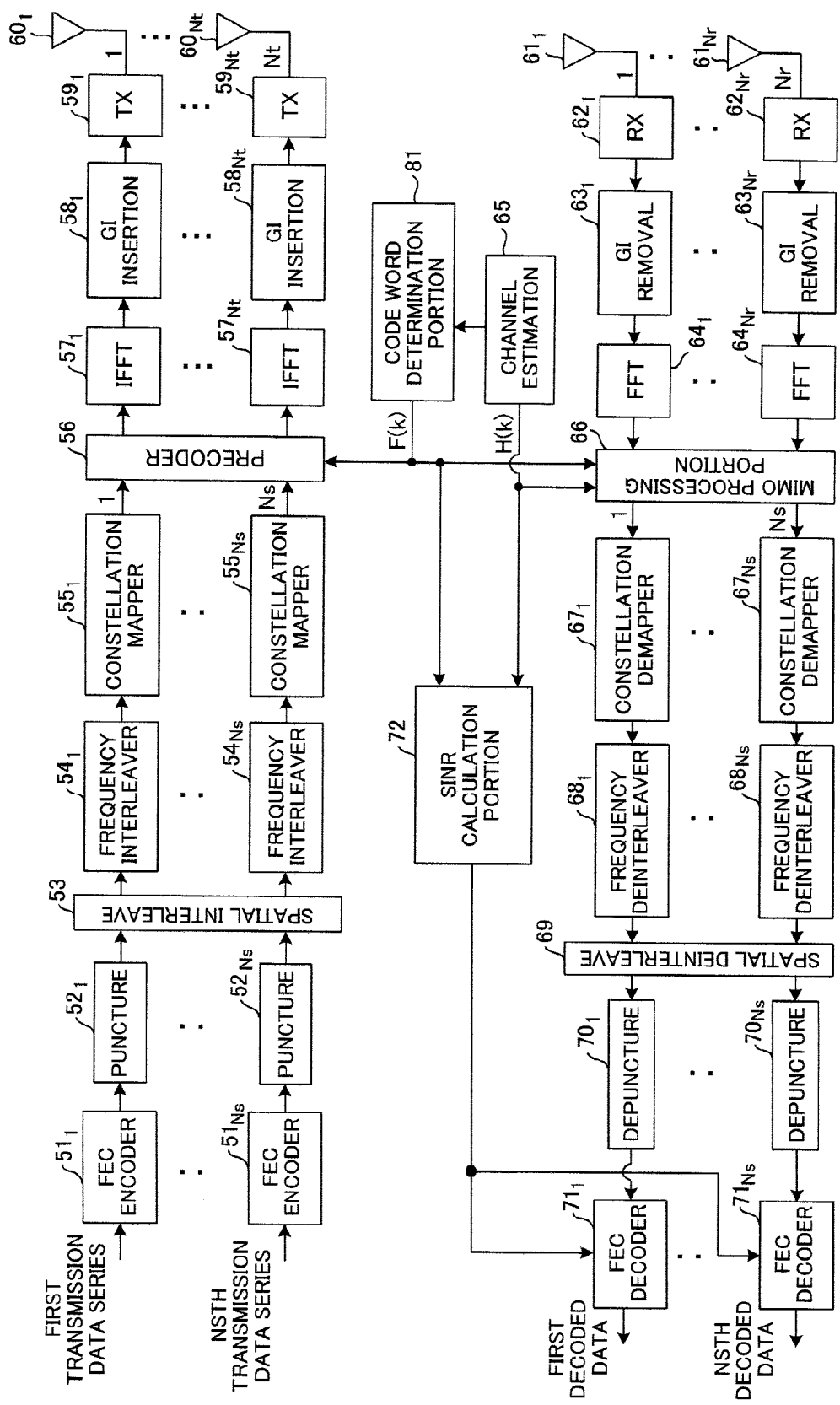
FIG. 8 is a configuration diagram of the MIMO-OFDM transmission/reception system of a fifth embodiment.

FIG. 8 shows the configuration of the MIMO-OFDM transmission/reception system of a fifth embodiment; portions which are the same as in the fourth embodiment of FIG. 7 are assigned the same symbols. A difference with the fourth embodiment is the fact that a spatial interleaver 53 is provided between the puncture portions $52_1$ to $52_{Ns}$ and the frequency interleavers $54_1$ to $54_{Ns}$.

In order to utilize spatial diversity, the spatial interleaver 53 rearranges the dta streams after puncturing of each of the data streams. The rearranged data streams are then each subjected to frequency interleaving and constellation mapping, and are input to the precoder 56. The precoder 56 performs precoding processing, according to a prescribed method, of the constellation-mapped signals. Subsequent processing is the same as in the first embodiment.

On the receiving side, the MIMO processing portion 66 separates data streams according to the MMSE decoding algorithm or the ZF decoding algorithm, and thereafter, for each of the separated data streams, constellation demapping, frequency deinterleaving, spatial deinterleaving, depuncture processing, and decoding processing (weighted error-correcting/decoding processing) are performed, in the order opposite that on the transmitting side.

FIG. 9 explains spatial interleaving; in this example, there are three input data streams and three output data streams. The spatial interleaver 53 distributes the first three data items of the first input data stream to each of the three output data streams, then distributes the first three data items of the second data stream to the three output data streams, and then distributes the first three data items of the third data stream to the three output data streams; thereafter, similar rearrangement is performed to execute spatial interleaving.

In the fifth embodiment, the circuit scale increases slightly compared with the fourth embodiment, but because the data streams can be processed in parallel, the circuit operating frequency can be lowered, and moreover spatial diversity can be utilized.

(G) Sixth Embodiment

Figure 10:
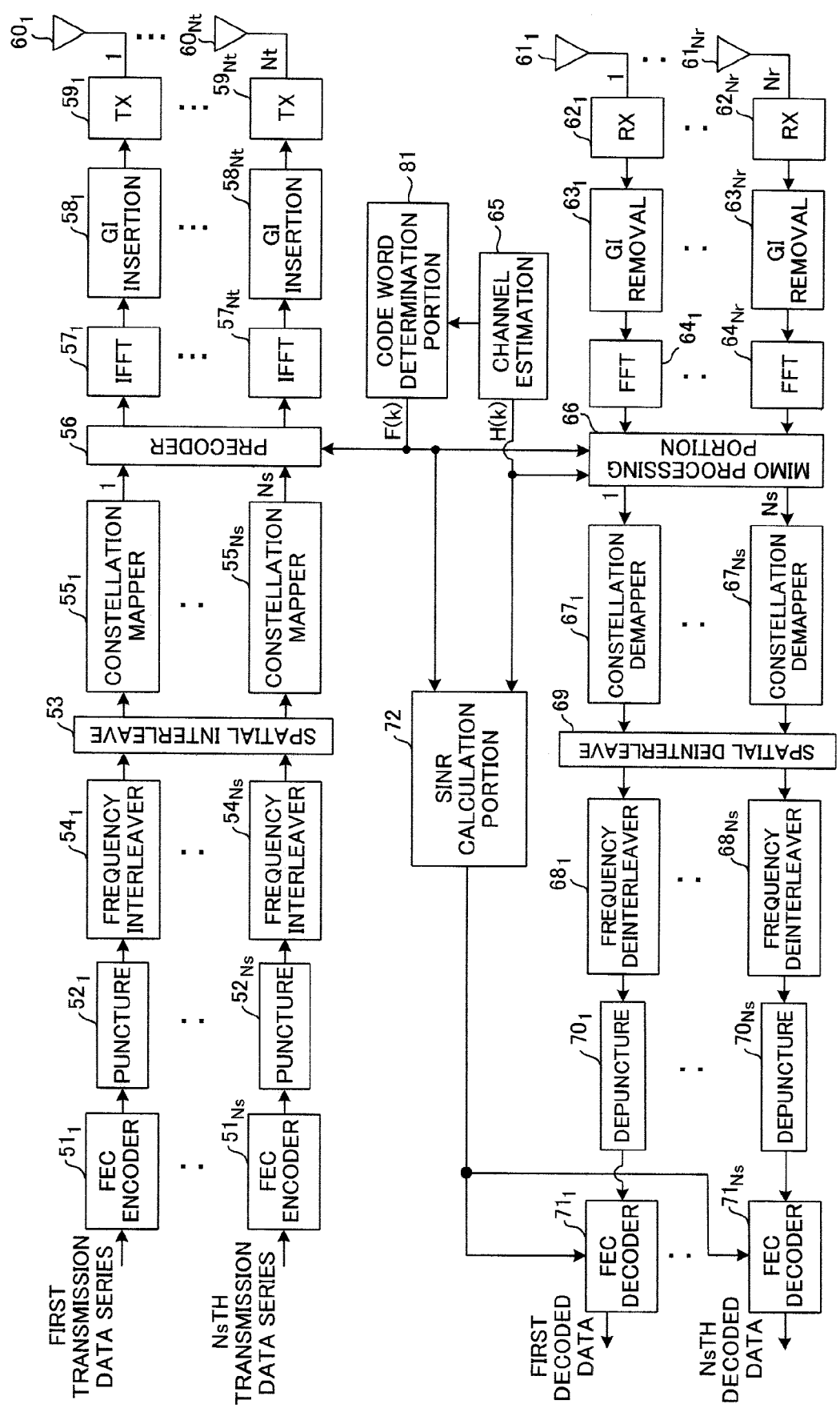
FIG. 10 is a configuration diagram of the MIMO-OFDM transmission/reception system of a sixth embodiment.

FIG. 10 shows the configuration of the MIMO-OFDM transmission/reception system of a sixth embodiment; portions which are the same as in the fourth embodiment of FIG. 7 are assigned the same symbols. A difference with the fourth embodiment is the fact that a spatial interleaver 53 is provided between the frequency interleavers $54_1$ to $54_{Ns}$ and the constellation mappers $55_1$ to $55_{Ns}$.

In order to utilize spatial diversity, the spatial interleaver 53 rearranges the data streams after performing frequency interleaving of the data streams. Then, constellation mapping is performed for each of the rearranged data streams, and the results are input to the precoder 56. The precoder 56 performs precoding processing of the constellation-mapped signals according to a prescribed method. The subsequent procedure is the same as in the first embodiment.

On the receiving side, the MIMO processing portion 66 separates data streams according to the MMSE decoding algorithm or ZF decoding algorithm, and thereafter, constellation demapping, spatial deinterleaving, frequency deinterleaving, depuncture processing, and decoding processing (weighted error-correction/decoding processing) of each of the separated data streams are performed, in the order opposite that on the transmitting side.

As a result of the sixth embodiment, the circuit scale is increased slightly compared with the fourth embodiment, but because the data streams can be rearranged, the circuit operating frequency can be lowered, and moreover spatial diversity can be utilized.

(H) Seventh Embodiment

Figure 11:
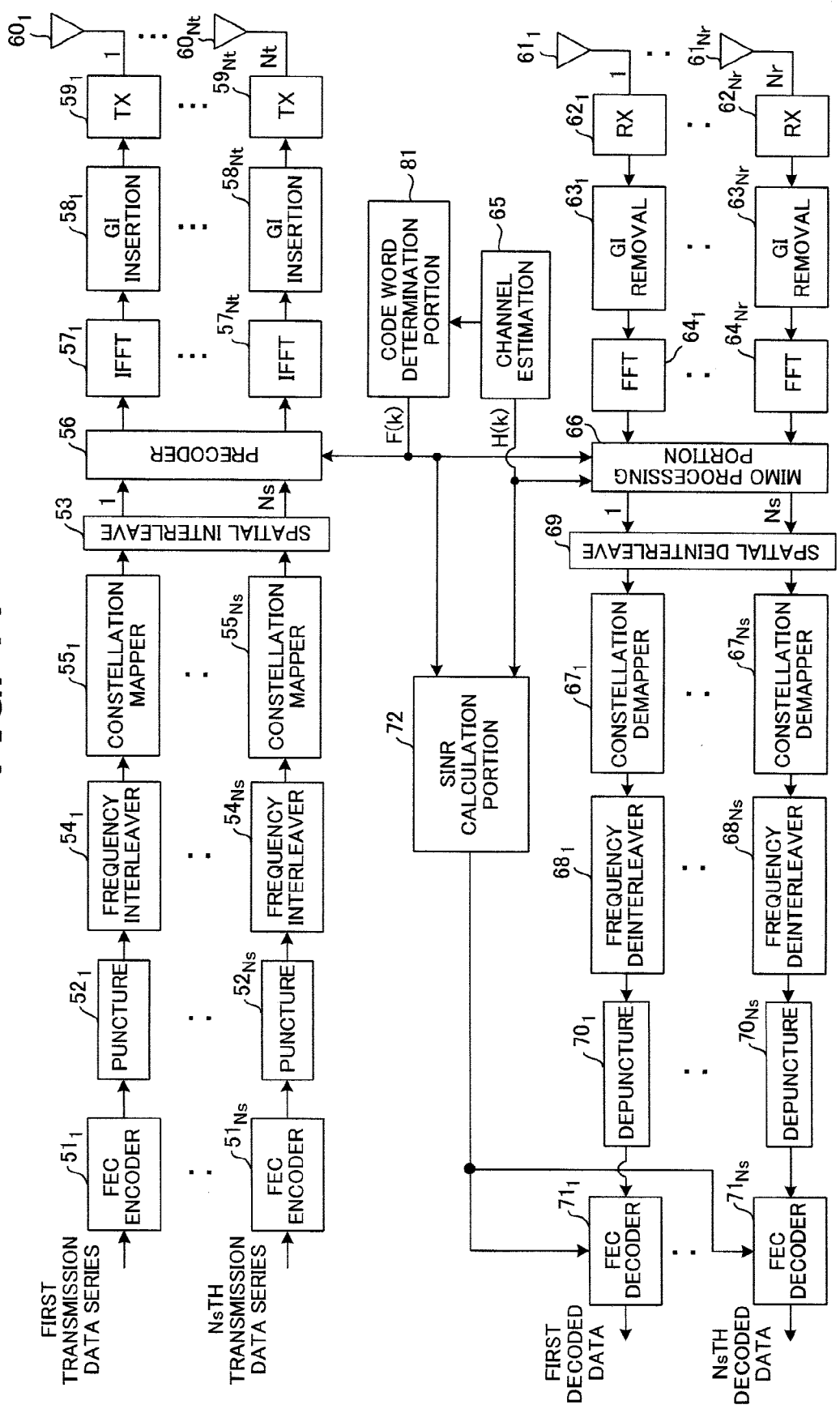
FIG. 11 is a configuration diagram of the MIMO-OFDM transmission/reception system of a seventh embodiment.

FIG. 11 shows the configuration of the MIMO-OFDM transmission/reception system of a seventh embodiment; portions which are the same as in the fourth embodiment of FIG. 7 are assigned the same symbols. A difference with the fourth embodiment is the fact that a spatial interleaver 53 is provided between the constellation mappers $55_1$ to $55_{Ns}$ and the precoder 56.

In order to utilize spatial diversity, the spatial interleaver 53 rearranges the data streams after performing constellation mapping of the data streams, and the results are input to the precoder 56. The precoder 56 performs precoding processing of the constellation-mapped signals according to a prescribed method. The subsequent procedure is the same as in the first embodiment.

On the receiving side, the MIMO processing portion 66 separates data streams according to the MMSE decoding algorithm or ZF decoding algorithm, and thereafter, spatial deinterleaving, constellation demapping, frequency deinterleaving, depuncture processing, and decoding processing (weighted error-correction/decoding processing) of each of the separated data streams are performed, in the order opposite that on the transmitting side.

As a result of the seventh embodiment, the circuit scale is increased slightly compared with the fourth embodiment, but because the data streams can be rearranged, the circuit operating frequency can be lowered, and moreover spatial diversity can be utilized.

(I) Eighth Embodiment

Figure 12:
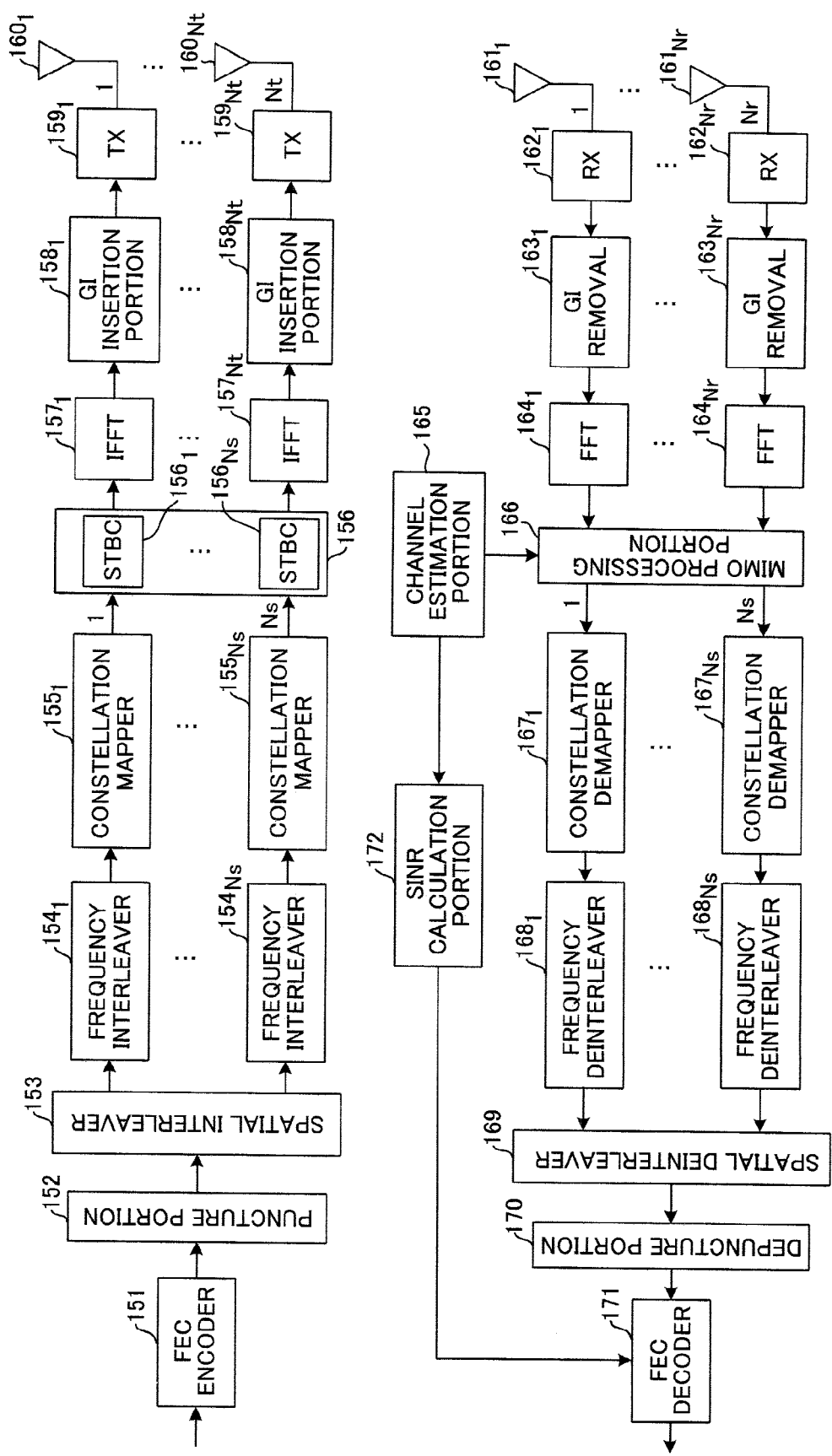
FIG. 12 is a configuration diagram of a MIMO-OFDM communication device in a hybrid STBC spatial multiplexing OFDM system (eighth embodiment)

FIG. 12 is a configuration diagram of a MIMO-OFDM communication device in a hybrid STBC spatial multiplexing OFDM system, having $N_t$ transmission antennas on the transmitting side and $N_r$ reception antennas on the receiving side. If the number of transmission data streams is $N_s$, then $N_s \leq \min[N_r, N_t]$.

On the transmitting side, the FEC encoder 151 performs encoding processing for error detection and correction of the input data stream using a convolution code, the puncture portion 152 performs puncture processing of the encoded data series according to the coding rate, and the spatial interleaver 153 divides the puncture-processed data bit series into a plurality of data streams, which in FIG. 12 are $N_s$ data streams. Specifically, the spatial interleaver 153 sends continuous blocks of s bits periodically to each data stream in turn (see FIG. 2).

The frequency interleavers $154_1$ to $154_{Ns}$ perform frequency interleaving in which the positions of the input serial data (subcarrier signal components) are interchanged. The constellation mappers $155_1$ to $155_{Ns}$ perform constellation mapping of each of the signal components for the number of subcarriers according to a prescribed data modulation method, for example, QPSK modulation.

Next, the STBC encoders $156_1$ to $156_{Ns}$ of the STBC portion 156 perform STBC encoding processing of the input serial data, convert the Ns data series into Nt data series, and map the result to Nt transmission antennas. FIG. 13 is an example of mapping two data streams to four antennas, and similarly, FIG. 14 is an example of mapping two data streams to three antennas. In the example of FIG. 13, the continuous two-symbol data with period T $[s_{11}, s_{12}]$ input from the constellation mapper $155_1$ is converted into two series of symbol data $[s_{11}, -s_{12}*], [s_{12}, s_{11}*]$ in the STBC encoder $156_1$, which are mapped to the transmission antennas $160_1, 160_2$. And, the continuous two-symbol data with period T $[s_{21}, s_{22}]$ input from the constellation mapper $155_2$ is converted into two series of symbol data $[s_{21}, -s_{22}*], [s_{22}, s_{21}*]$ in the STBC encoder $156_2$, which are mapped to the transmission antennas $160_3, 160_4$. In the example of FIG. 14, the continuous two-symbol data with period T $[s_{11}, s_{12}]$ input from the constellation mapper $155_1$ is converted into two series of symbol data $[s_{11}, -s_{12}*], [s_{12}, s_{11}*]$ in the STBC encoder $156_1$, which are mapped to the transmission antennas $160_1, 160_2$, but the continuous two-symbol data with period T $[s_{21}, s_{22}]$ input from the constellation mapper $155_2$ is mapped to the transmission antenna $160_3$ as-is, without performing STBC encoding processing.

Figure 15:
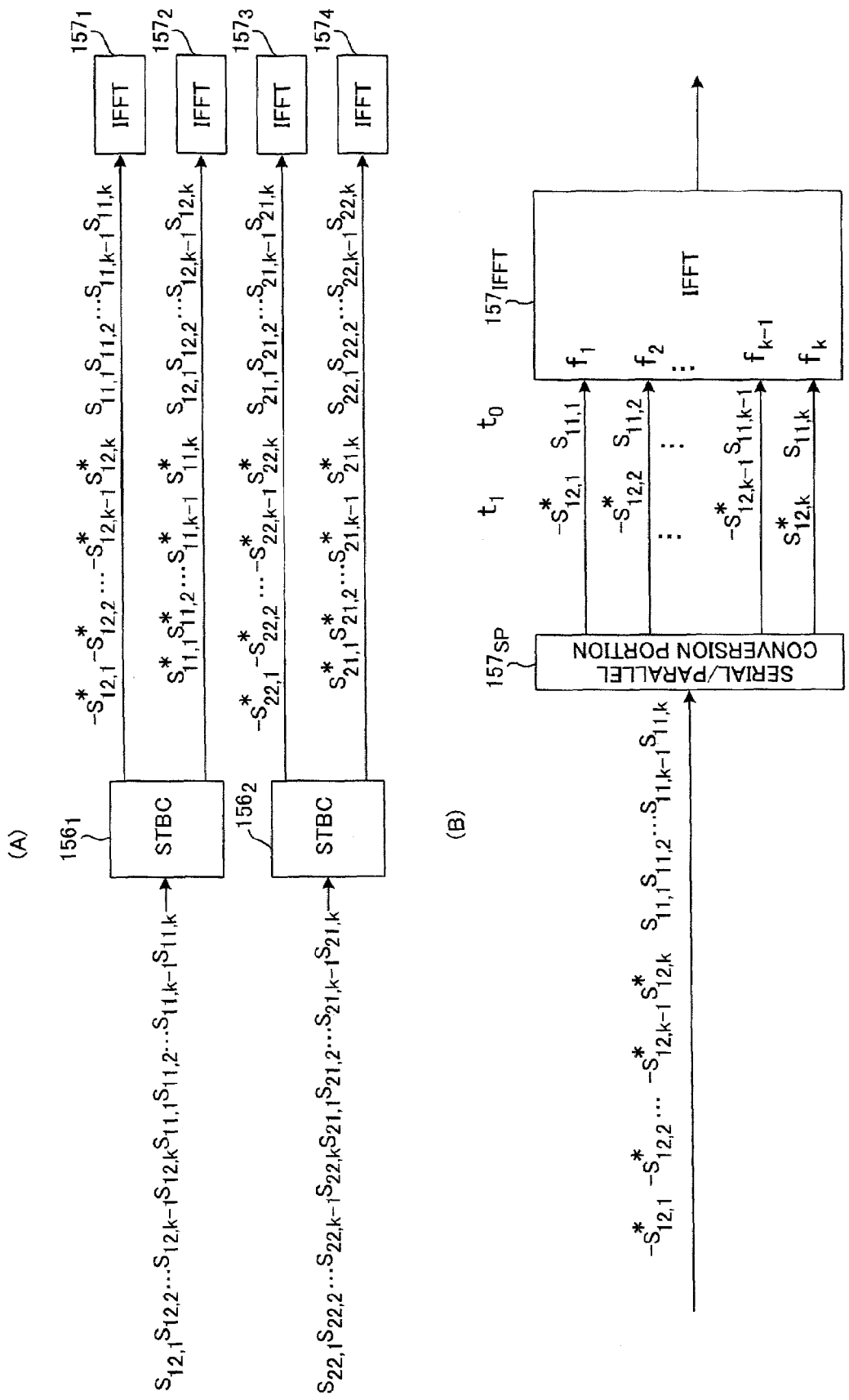
FIG. 15 explains STBC-IFFT processing.

The IFFT (Inverse Fast Fourier Transform) portions $157_1$ to $157_{Nt}$ convert the series-input data from the STBC portion 156 into parallel data for the number of subcarriers, and then perform IFFT (inverse Fourier transform) of this parallel data, combining the data in discrete time signals (OFDM signals), which are output. FIG. 15 explains IFFT processing. The STBC encoder $156_1$ performs the above STBC encoding processing of the continuous two OFDM symbols input from the constellation mapper $155_1$, as shown in (A) of FIG. 15, and generates two respective series. The serial/parallel conversion portion $157_{SP}$ of the IFFT portion $157_1$ converts the serial STBC encoded data input from the STBC encoder $156_1$ into k parallel data at time t0 and k parallel data at time t1 as shown in (B) of FIG. 15, and the IFFT processing portion $157_{IFFT}$ performs IFFT (inverse Fourier transform) processing in order on each of the parallel data series, combining the data for output as discrete time signals (OFDM signals). The IFFT portion $157_2$ performs processing similar to that of the IFFT portion $157_1$. And, the STBC encoder $156_2$ and IFFT portions $157_3$ and $157_4$ operate similarly to the STBC encoder $156_1$ and IFFT portions $157_1$ and $157_2$.

Returning to FIG. 12, the guard interval insertion portions $158_1$ to $158_{Nt}$ insert guard intervals into the OFDM signals input from the IFFT portions, the transmission portion (TX) $159_1$ to $159_{Nt}$ perform DA conversion of the OFDM signals with guard intervals inserted, and the OFDM signal frequency is converted from baseband to a wireless range, signals are high-frequency amplified, and transmitted from the antennas $160_1$ to $160_{Nt}$.

Signals transmitted from the transmission antennas $160_1$ to $160_{Nt}$ pass through fading channels (transmission paths), and are received by the reception antennas $161_1$ to $161_{Nr}$ of the reception device; the receiving circuits (Rx) $162_1$ to $162_{Nr}$ convert the RF signals received by the antennas into baseband signals, and perform AD conversion of the baseband signals into digital signals, which are output. The symbol extraction portions $163_1$ to $163_{Nr}$ delete the guard intervals GI, extract OFDM symbols with FFT timing, and input the signals to the FFT portions $164_1$ to $164_{Nr}$. The FFT portions $164_1$ to $164_{Nr}$ perform FFT processing for each OFDM symbol extracted, converting the symbols into frequency-domain subcarrier samples.

In the case of the STBC encoding processing of (A) of FIG. 13, the reception signals $y_{11}$, $y_{12}$, $y_{21}$, $y_{22}$ of the signals $s_{11}$, $s_{12}$, $s_{21}$, $s_{22}$ transmitted by the subcarriers $f_1$ can be expressed by the following equation.

$$\begin{bmatrix} y_{11} & y_{12} \\ y_{21} & y_{22} \end{bmatrix} = \begin{bmatrix} h_{11} & h_{12} & h_{13} & h_{14} \\ h_{21} & h_{22} & h_{23} & h_{24} \end{bmatrix} \begin{bmatrix} s_{11} & -s_{12}^* \\ s_{12} & s_{11}^* \\ s_{21} & -s_{22}^* \\ s_{22} & s_{21}^* \end{bmatrix} + \begin{bmatrix} w_{11} & w_{12} \\ w_{21} & w_{22} \end{bmatrix} \quad (29)$$

In equation (29), $h_{i,j}$ is the channel response at frequency $f_1$ from the jth transmitting channel to the ith reception antenna shown in (B) of FIG. 13. $s_{i,j}$ represents the jth symbol in the ith data stream. $y_{i,j}$ represents the jth received symbol at the ith reception antenna. $w_{i,j}$ represents the jth received symbol AWGN noise at the ith reception antenna.

Similarly, the received signals $y_{13}$, $y_{14}$, $y_{23}$, $y_{24}$ of the signals $s_{13}$, $s_{14}$, $s_{23}$, $s_{24}$ transmitted by the subcarrier $f_2$ can be represented by the following equation. $h_{i,j}'$ is the channel response at frequency $f_2$ of the ith reception antenna from the jth transmission antenna.

$$\begin{bmatrix} y_{13} & y_{14} \\ y_{23} & y_{24} \end{bmatrix} = \begin{bmatrix} h'_{11} h'_{12} h'_{13} h'_{14} \\ h'_{21} h'_{22} h'_{23} h'_{24} \end{bmatrix} \begin{bmatrix} s_{13} & -s_{14}^* \\ s_{14} & s_{13}^* \\ s_{23} & -s_{24}^* \\ s_{24} & s_{23}^* \end{bmatrix} + \begin{bmatrix} w_{13} & w_{14} \\ w_{23} & w_{24} \end{bmatrix} \quad (30)$$

From the above, the received signals for each subcarrier component can be represented by equations similar to equation (29).

The following equation obtains from a simple conversion from equation (29). This conversion is conversion of the two-row, two-column matrix on the left side in equation (29) into a four-row, one-column vector. The following equations (31) to (40) are general expressions without addition of a subcarrier index k, but are equations which obtain for each subcarrier.

$$y_e = H_e s_e + w_e \quad (31)$$

Where $$s = [s_{11} s_{12} s_{13} s_{14}] \quad (32)$$

$$H_e = \begin{bmatrix} h_{11} & h_{12} & h_{13} & h_{14} \\ h_{12}^* & -h_{11}^* & h_{14}^* & -h_{13}^* \\ h_{21} & h_{22} & h_{23} & h_{24} \\ h_{22}^* & -h_{21}^* & h_{24}^* & -h_{23}^* \end{bmatrix} \quad (33)$$

$$y_e = [y_{11} y_{12}^* y_{21} y_{22}^*]^T \quad (34)$$

$$w_e = [w_{11} w_{12}^* w_{21} w_{22}^*]^T \quad (35)$$

Here $(.)^T$ indicates the matrix transpose. Also, the channel correlation profile of He has the following characteristic.

$$H_e' H_e = \begin{bmatrix} A & B \\ C & D \end{bmatrix} = \begin{bmatrix} \alpha_1 I_2 & B \\ B & \alpha_2 I_2 \end{bmatrix} \quad (33a)$$

In this equation, $$B = \begin{bmatrix} \beta_1 & \beta_2 \\ -\beta_2^* & \beta_1 \end{bmatrix} \quad (33b)$$

$$\alpha_1 = \sum_{i=1}^{Nr} (|h_{i1}|^2 + |h_{i2}|^2),$$

$$\alpha_2 = \sum_{i=1}^{Nr} (|h_{i3}|^2 + |h_{i4}|^2)$$

$$\beta_1 = \sum_{i=1}^{Nr} (h_{i1}^* h_{i3} + h_{i2} h_{i4}^*), \ \beta_2 = \sum_{i=1}^{Nr} (h_{i1}^* h_{i4} - h_{i2} h_{i3}^*) \quad (33c)$$

Similarly, by a simple conversion from FIG. 14, the following equations $$s_e = [s_{11} s_{12} s_{21} s_{22}^*]^T \quad (36)$$

$$S_e = [s_{11} \ s_{12} \ s_{21} \ s_{22}^*]^T \quad (36)$$

$$H_e = \begin{bmatrix} h_{11} & h_{12} & h_{13} & 0 \\ h_{12}^* & -h_{11}^* & 0 & h_{13}^* \\ h_{21} & h_{22} & h_{23} & 0 \\ h_{22}^* & -h_{21}^* & 0 & h_{23}^* \end{bmatrix} \quad (37)$$

are obtained. $y_e$ and $w_e$ are respectively the same as in equation (34) and equation (35). The above is for cases in which Ns=2, Nt=3 and Ns=2, but clearly application to two or more transmission data streams and to three or more transmission antennas is possible.

In the receiver, $y_e$ and $H_e$ are known, and so the MIMO processing portion 166 can use maximum likelihood (ML) to determine transmission signals. However, due to the vast increase in complexity, a linear decoder of reduced complexity is adopted. In the linear decoder, the following equation obtains.

$$\hat{s}_e = G_e y_e \quad (38)$$

Here Ge is a 2Ns×2Nr matrix. When using a ZF (Zero Forcing) linear decoder, Ge is given by the following equation.

$$G_e = H_e^+ = (H_e' H_e)^{-1} H_e' \quad (39)$$

Here $(.)^+$ represents the pseudo-inverse of a matrix, and $(.)'$ represents the complex conjugate transpose.

The inverse matrix in equation (39) can be represented by the following equation.

$$(H_e' H_e)^{-1} = \frac{1}{\alpha_1 \alpha_2 - (|\beta_1|^2 + |\beta_2|^2)} \begin{bmatrix} \alpha_2 I_2 & -B \\ -B' & \alpha_1 I_2 \end{bmatrix} \quad (39a)$$

As shown in equation (39a), in actuality there is no need to calculate the inverse matrix, and the complexity can be reduced.

On the other hand, when a MMSE (Minimum Mean Square Error) linear decoder is used, Ge is given by the following equation.

$$G_e = \left(H'_e H_e + \left(2N_s \frac{N_0}{\varepsilon_s}\right)I_{2N_s}\right)^{-1} H'_e \quad (40)$$

Here $(.)^{-1}$ represents matrix inversion, and $(\ )'$ represents the complex conjugate transpose. Also, $N_0$ is the antenna received noise power, $\varepsilon_s$ is the total transmission power of the kth subcarrier, and $I_{2N_s}$ is a 2Ns×2Ns identity matrix.

Similarly to equation (39a), the inverse matrix in equation (40) can be represented as follows.

$$(H'_e H_e + (2N_s N_0/\varepsilon_s)I_{2N_s})^{-1} = \frac{1}{\left(\alpha_1 + \frac{2N_s N_0}{\varepsilon_s}\right)\left(\alpha_2 + \frac{2N_s N_0}{\varepsilon_s}\right) - (|\beta_1|^2 + |\beta_2|^2)} \begin{bmatrix} \left(\alpha_2 + \frac{2N_s N_0}{\varepsilon_s}\right) & -B \\ -B' & \left(\alpha_1 + \frac{2N_s N_0}{\varepsilon_s}\right)I_2 \end{bmatrix} \quad (40a)$$

As indicated in equation (40a), in actuality there is no need to calculated the inverse matrix, and the complexity can be reduced.

The SINR calculation portion 172 uses the channel matrix He, described below, to calculate $SINR_j(k)$ and input the result to the decoding portion 171. The constellation demappers 167$_1$ to 167$_{Ns}$, frequency deinterleavers 168$_1$ to 168$_{Ns}$, spatial deinterleaver 169, depuncture portion 170, and decoding portion 171 perform demapping processing, frequency deinterleave processing, spatial deinterleave processing, and decoding processing (weighted error correction/decoding processing), in the reverse order of the transmitting-side processing, of each of the data streams $\hat{s}(k)$, which are separated by the MIMO processing portion 166, according to equations (38) and (39), or according to equations (38) and (40).

The decoding portion 171 regards the SINR input from the SINR calculation portion 172 as the signal reliability, performs weighted multiplication of this SINR with the Viterbi decoding path metric, and executes weighted error correction/decoding processing.

(1) SINR Calculation and Viterbi Decoding When Using a ZF Decoder

When using a ZF decoder (ZF decoding algorithm) for transmission signal separation, the SINR calculation portion 172 calculates the SINR for each subcarrier k using the following equations, and inputs the results to the decoding portion 171.

$$SINR_j^{(ZF)}(k) = \frac{\varepsilon_s}{2N_s N_0 [(H'_e(k)H_e(k))^{-1}]_{j,j}} \propto \frac{1}{[(H'_e(k)H_e(k))^{-1}]_{j,j}} \quad (41)$$

$$SINR_1^{(ZF)} = SINR_2^{(ZF)} = \frac{\varepsilon_s}{2N_s N_0}\left(\alpha_1 - \frac{|\beta_1|^2 + |\beta_2|^2}{\alpha_2}\right) \propto \left(\alpha_1 - \frac{|\beta_1|^2 + |\beta_2|^2}{\alpha_2}\right)$$

$$SINR_3^{(ZF)} = SINR_4^{(ZF)} = \frac{\varepsilon_s}{2N_s N_0}\left(\alpha_2 - \frac{|\beta_1|^2 + |\beta_2|^2}{\alpha_1}\right) \propto \left(\alpha_2 - \frac{|\beta_1|^2 + |\beta_2|^2}{\alpha_1}\right) \quad (42)$$

Here j is the index of the layers of the converted channel. "Layer index" means the index of the column in the square matrix in equation (33) or equation (37). That is, columns in the above square matrices are defined as layers. Also, $[*]_{j,j}$ is the element in the jth row and jth column of the matrix. The decoding portion 171 multiplies the Viterbi path metric by the SINR as shown in the following equation, thereby weighting is realized.

$$P_{i,n} = SINR_{2i-1}^{(ZF)}(k)|\hat{b}_{i,n}^{(ZF)}(k) - b_{i,n}^{(ZF)}(k)|^2 \quad (43)$$

Here n is the demapped bit index. For example, in the case of 16QAM modulation, demapped bits are four bits b1 to b4, so that if n=1 then b1 is meant, and n=2 means b2. i is the data stream index. Also, $\hat{b}_{i,n}^{(ZF)}(k)$ is a soft decision value, and $b_{i,n}^{(ZF)}(k)$ is a reference value. By weighting the Viterbi path metric with the SINR as described above, the increase in noise due to the ZF decoding algorithm is reduced, and performance can be improved.

(2) SINR Calculation and Viterbi Decoding When Using an MMSE Decoder

When using an MMSE decoder (MMSE decoding algorithm) for transmission signal separation, the SINR calculation portion 172 calculates the SINR for each subcarrier k using the following equations, and inputs the results to the decoding portion 171.

$$SINR_j^{(MMSE)}(k) = \frac{\varepsilon_s}{2N_s N_0 [(H'_e(k)H_e(k) + (2N_s N_0/\varepsilon_s)I_{2N_s})^{-1}]_{j,j}} - 1 \quad (44)$$

$$SINR_1^{(MMSE)} = SINR_2^{(MMSE)} = \frac{\varepsilon_s}{2N_s N_0}\left(\alpha_1 - \frac{|\beta_1|^2 + |\beta_2|^2}{\alpha_2 + 2N_s N_0/\varepsilon_s}\right)$$

$$SINR_3^{(MMSE)} = SINR_4^{(MMSE)} = \frac{\varepsilon_s}{2N_s N_0}\left(\alpha_2 - \frac{|\beta_1|^2 + |\beta_2|^2}{\alpha_1 + 2N_s N_0/\varepsilon_s}\right) \quad (45)$$

The decoding portion 171 multiplies the Viterbi path metric by the SINR as shown in the following equation.

$$P_{i,n} = SINR_{2i-1}^{(MMSE)}(k)|\hat{b}_{i,n}^{(MMSE)}(k) - b_{i,n}^{(MMSE)}(k)|^2 \quad (46)$$

By weighting the Viterbi path metric by the SINR as above, the noise increase due to the MMSE decoding algorithm is reduced, and performance can be improved.

To weight the MMSE-decoded signal, $SINR_j^{(ZF)}(k)$ calculated using equation (41) can be used. Conversely, for a ZF-decoded signal, $SINR_j^{(MMSE)}(k)$ calculated using equation (44) can be used as a weighting.

Further, in order to reduce complexity, when the SINR is equal to or less than a threshold value, the SINR may be set equal to 0, and when the SINR is equal to or above a certain threshold value, the SINR may be set equal to 1.

When a linear decoder ZF and linear decoder MMSE are used, noise is increased, but in this invention, by weighting the Viterbi path metric by the SINR, this noise increase can be reduced. That is, in this invention the SINR is calculated for each of the converted channel layers and each subcarrier, this SINR is adopted as the reliability of the demodulated signal, and weighted Viterbi decoding is performed as indicated by equations (43) and (46). By this means, when the SINR is small (when the noise increase is large), the contribution of the Viterbi path metric is reduced, and conversely, when the SINR is large (when the noise increase is small), the contribution of the Viterbi path metric is increased, so that as a result the performance can be improved.

(J) Ninth Embodiment

Figure 16:
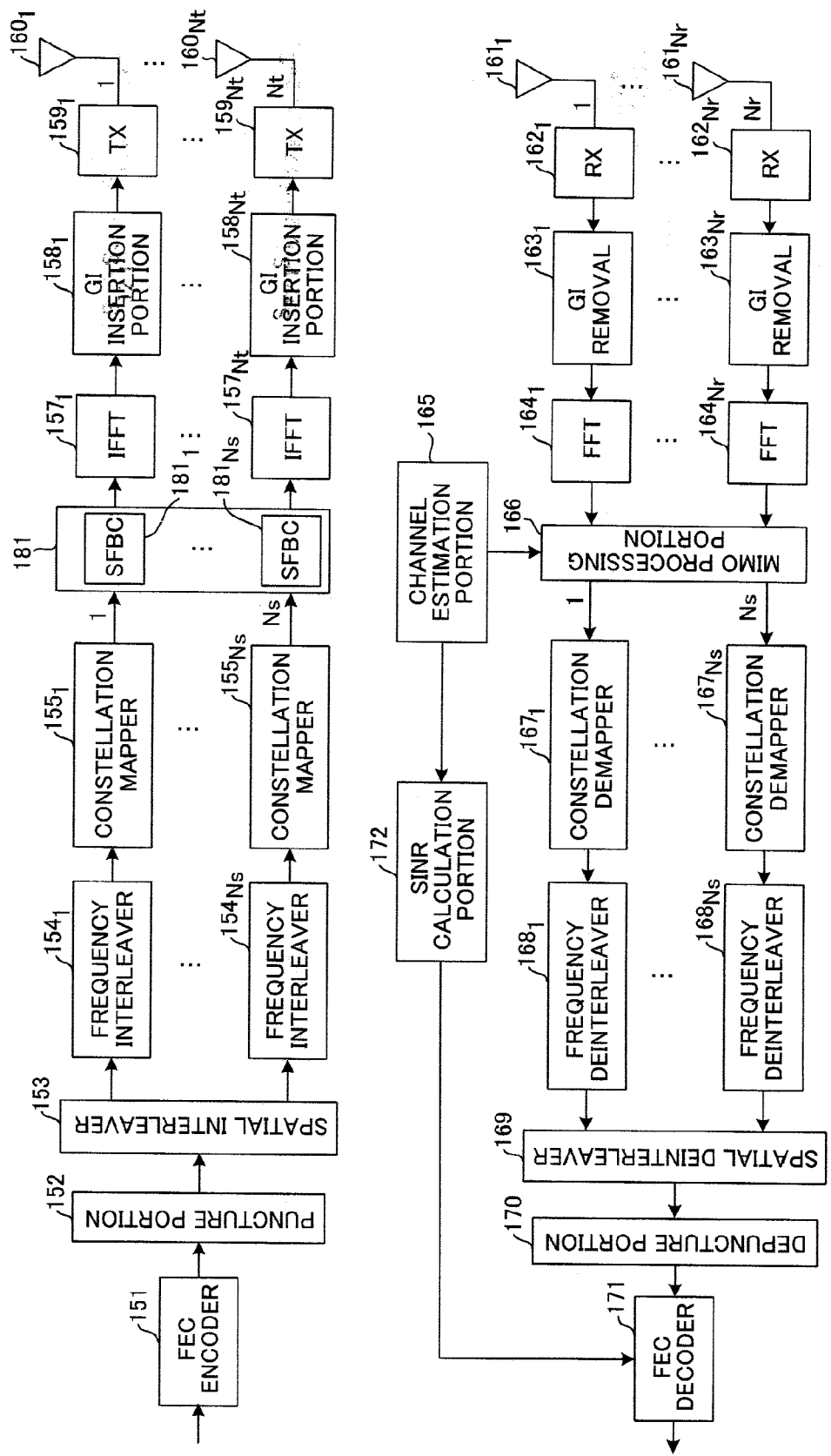
FIG. 16 is a configuration diagram of a MIMO-OFDM communication device in a hybrid SFBC spatial multiplexing OFDM system (ninth embodiment)

FIG. 16 is a configuration diagram of the MIMO-OFDM communication device in a hybrid SFBC spatial multiplexing OFDM system; portions which are the same as in the eighth embodiment of FIG. 12 are assigned the same symbols. A difference in the provision of a SFBC (Space Frequency Block Coding) portion 181 in place of the STBC portion 156.

Figure 17:
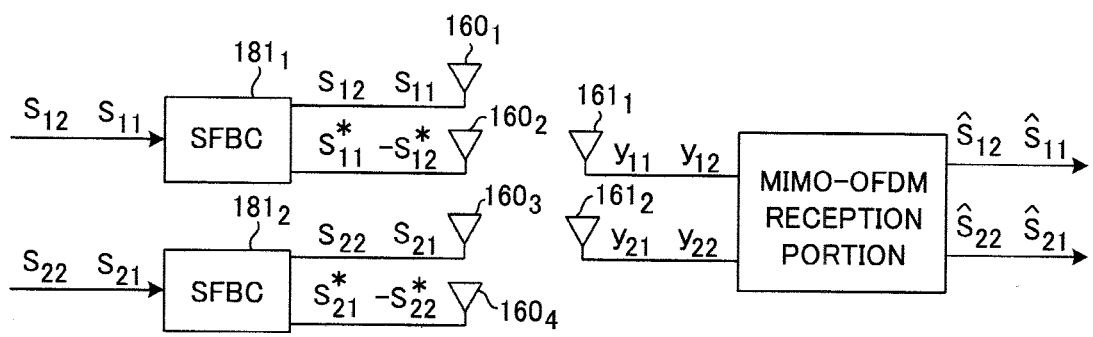
FIG. 17 explains SFBC encoding processing to map two data streams to four antennas.
Figure 18:
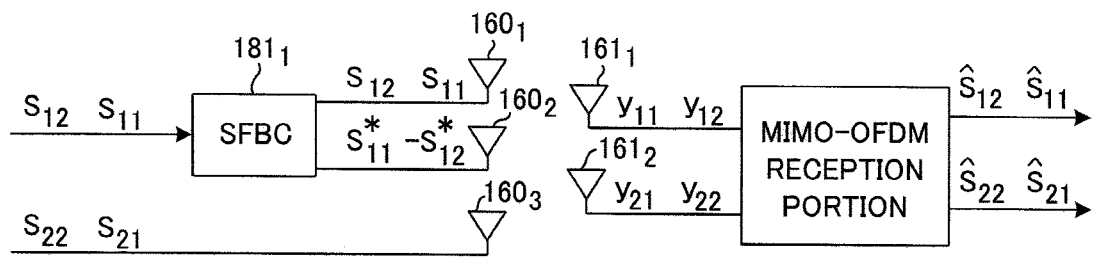
FIG. 18 explains SFBC encoding processing to map two data streams to three antennas.

The SFBC encoders $181_1$ to $181_{Ns}$ of the SFBC portion 181 perform SFBC encoding processing of input serial data, convert the Ns data series into Nt data series, and map the result to Nt transmission antennas. FIG. 17 is an example of mapping of two data streams to four antennas, and similarly, FIG. 18 is an example of mapping of two data streams to three antennas. In the example of FIG. 17, the continuous two-subcarrier data $[s_{11}, s_{12}]$ input from the constellation mapper $155_1$ is converted into the symbol data series $[s_{11}, s_{12}], [-s_{12}{}^*, s_{11}{}^*]$ of the subcarriers $[f_1, f_2]$ in the SFBC encoder $181_1$, and is mapped to the transmission antennas $160_1, 160_2$. And, the continuous two-subcarrier data $[s_{21}, s_{22}]$ input from the constellation mapper $155_2$ is converted into the symbol data series $[s_{21}, s_{22}], [-s_{22}{}^*, s_{21}{}^*]$ of the subcarriers $[f_1, f_2]$ in the SFBC encoder $181_2$, and is mapped to the transmission antennas $160_3, 160_4$. In the example of FIG. 18, the continuous two-subcarrier data $[s_{11}, s_{12}]$ input from the constellation mapper $155_1$ is converted into the symbol data series $[s_{11}, s_{12}], [-s_{12}{}^*, s_{11}{}^*]$ of the subcarriers $[f_1, f_2]$ in the SFBC encoder $181_1$, and is mapped to the transmission antennas $160_1, 160_2$, but the continuous two-subcarrier data $[s_{21}, s_{22}]$ input from the constellation mapper $155_2$ is mapped as-is to the transmission antenna $160_3$, without performing SFBC encoding processing.

Figure 19:
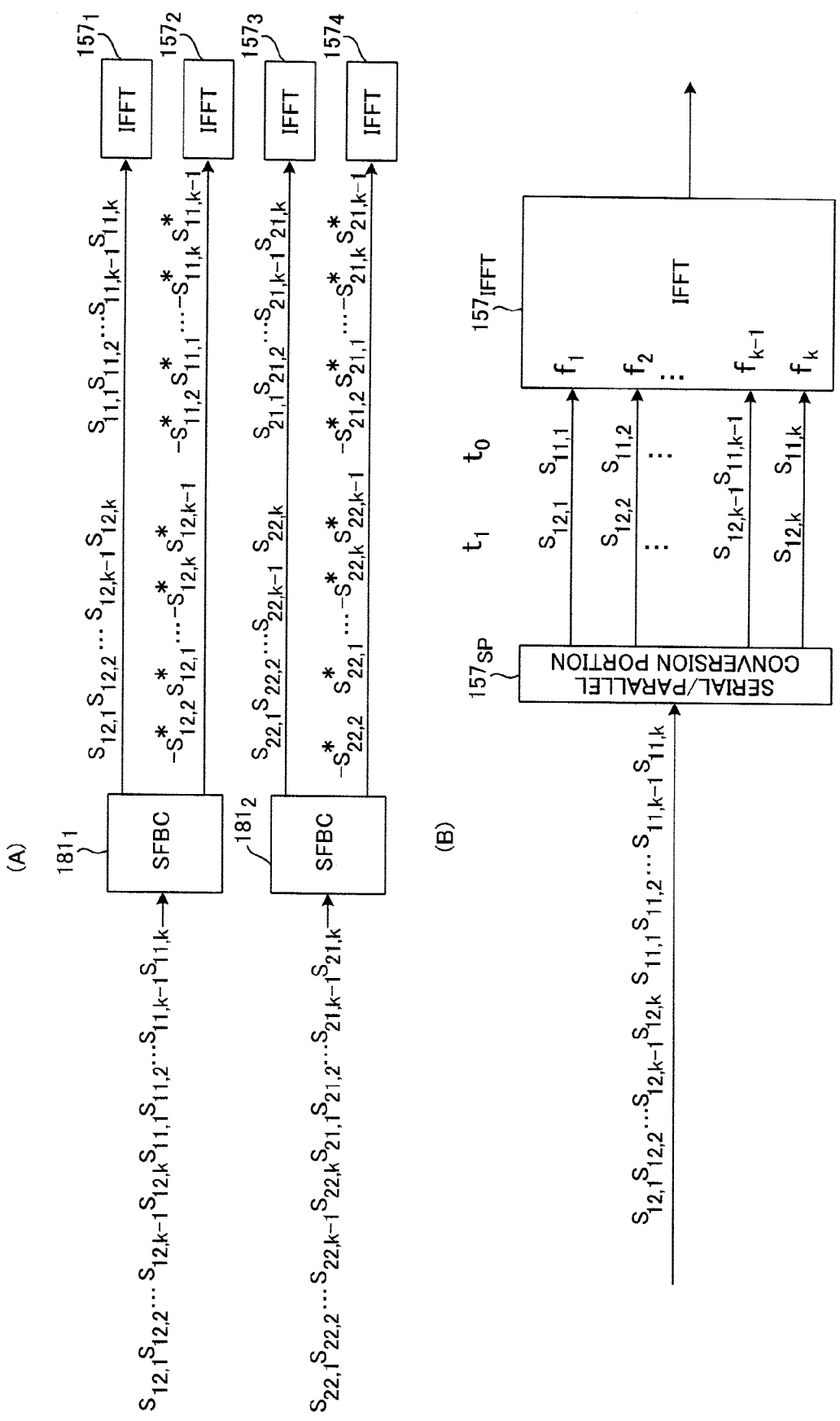
FIG. 19 explains SFBC-IFFT processing.

The IFFT portions $157_1$ to $157_{Nt}$ convert the serially input data from the SFBC portion 181 into parallel data series for the number of subcarriers, and then perform IFFT (inverse Fourier transform) processing of the parallel data to combine the data into discrete time signals (OFDM signals), which are output. FIG. 19 explains the IFFT processing. The SFBC encoder $181_1$ performs the above SFBC encoding processing of the continuous 2 OFDM symbols input from the constellation mapper $155_1$, and generates two series each of subcarrier $f_i$, $f_{i+1}$ (i=1,3, ..., k–1) components at times t0 and t1 as shown in (A) of FIG. 19. The serial/parallel conversion portion $157_{SP}$ of the IFFT portion $157_1$ converts serial SFBC-encoded data input from the SFBC encoder $181_1$ into k parallel data series at times t0 and t1, as shown in (B) of FIG. 19, the IFFT processing portion $157_{IFFT}$ performs IFFT (inverse Fourier transform) processing of the parallel data and combines the data into discrete time signals (OFDM signals), which are output. The IFFT portion $157_2$ also performs processing similar to that of the IFFT portion $157_1$. And, the SFBC encoder $181_2$ and the IFFT portions $157_3$ and $157_4$ operate similarly to the SFBC encoder $181_1$ and the IFFT portions $157_1$ and $157_2$. The operation of other portions is the same as in the first embodiment.

(K) Tenth Embodiment

Figure 20:
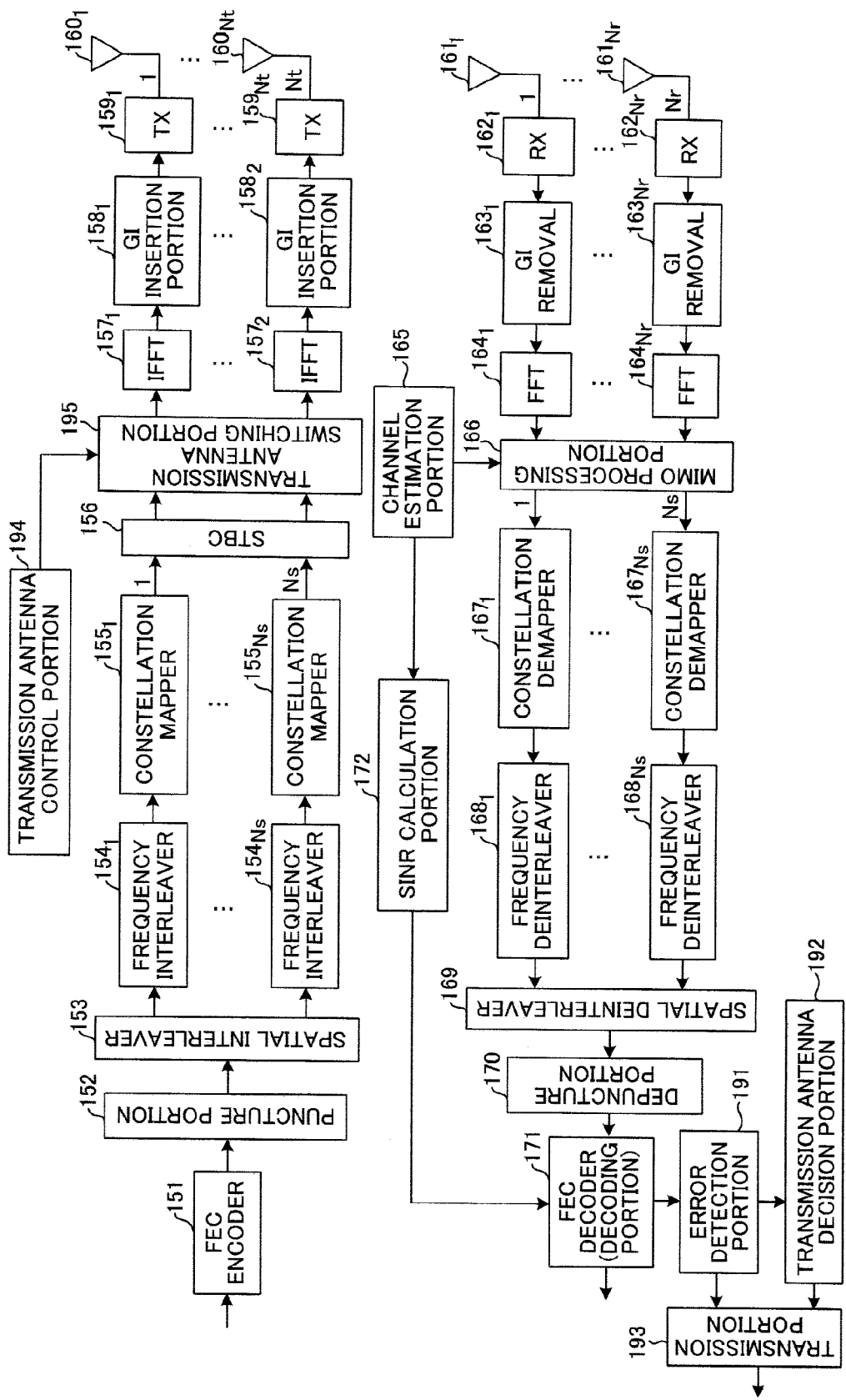
FIG. 20 is a configuration diagram of a MIMO-OFDM communication device provided with retransmit functions (tenth embodiment)
Figure 21:
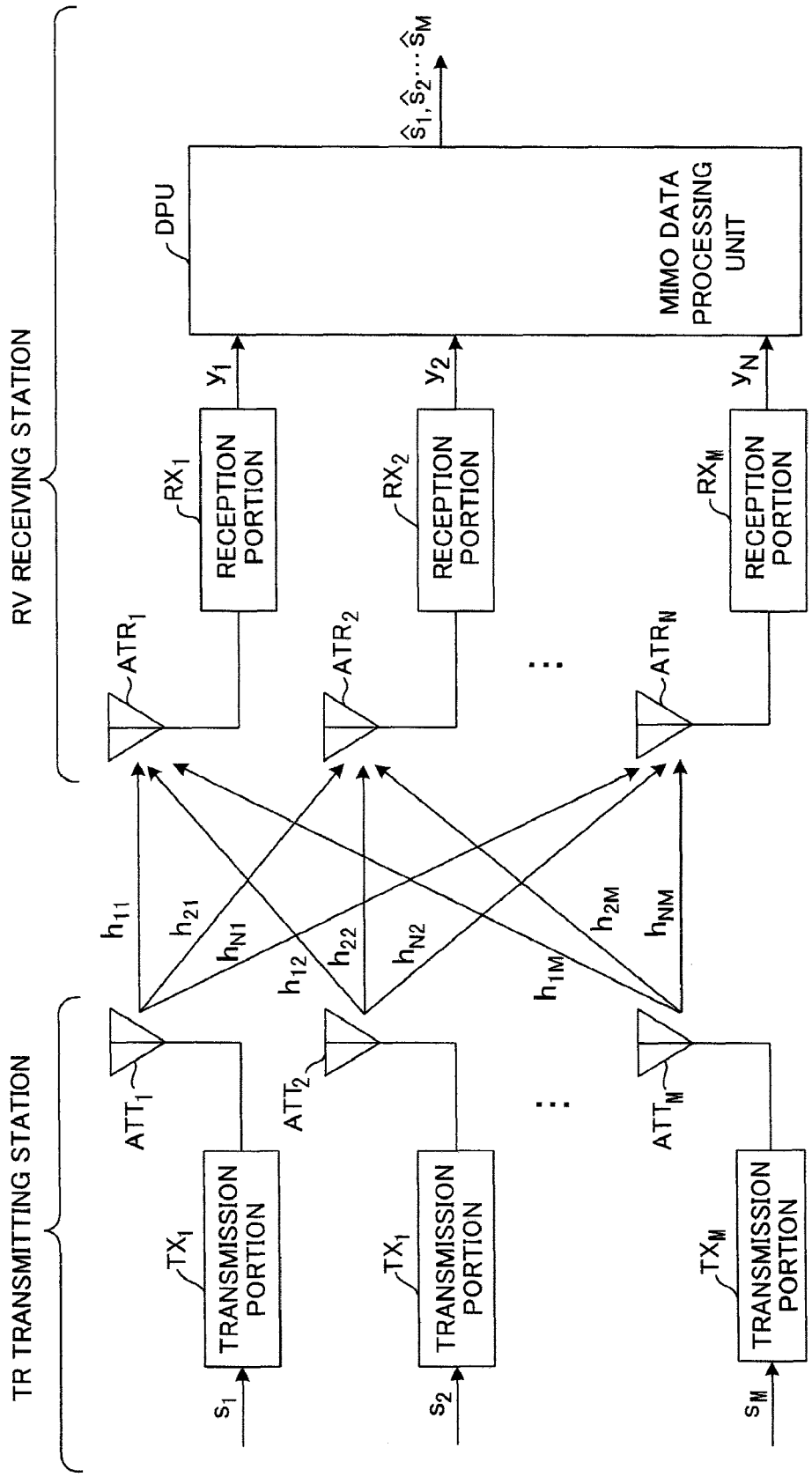
FIG. 21 explains the configuration of a MIMO system.
Figure 22:
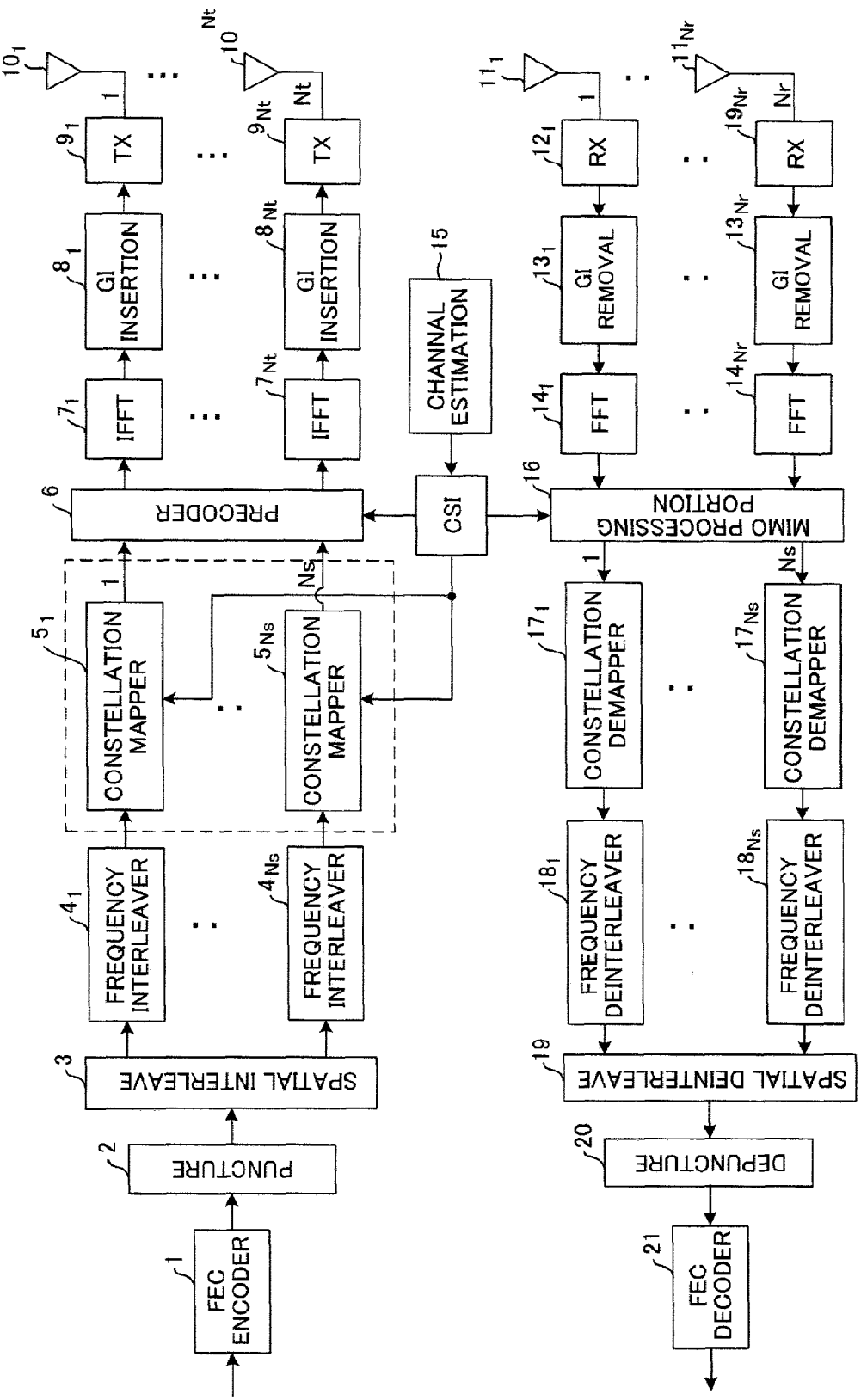
FIG. 22 is a configuration diagram of a conventional MIMO-OFDM system.
Figure 23:
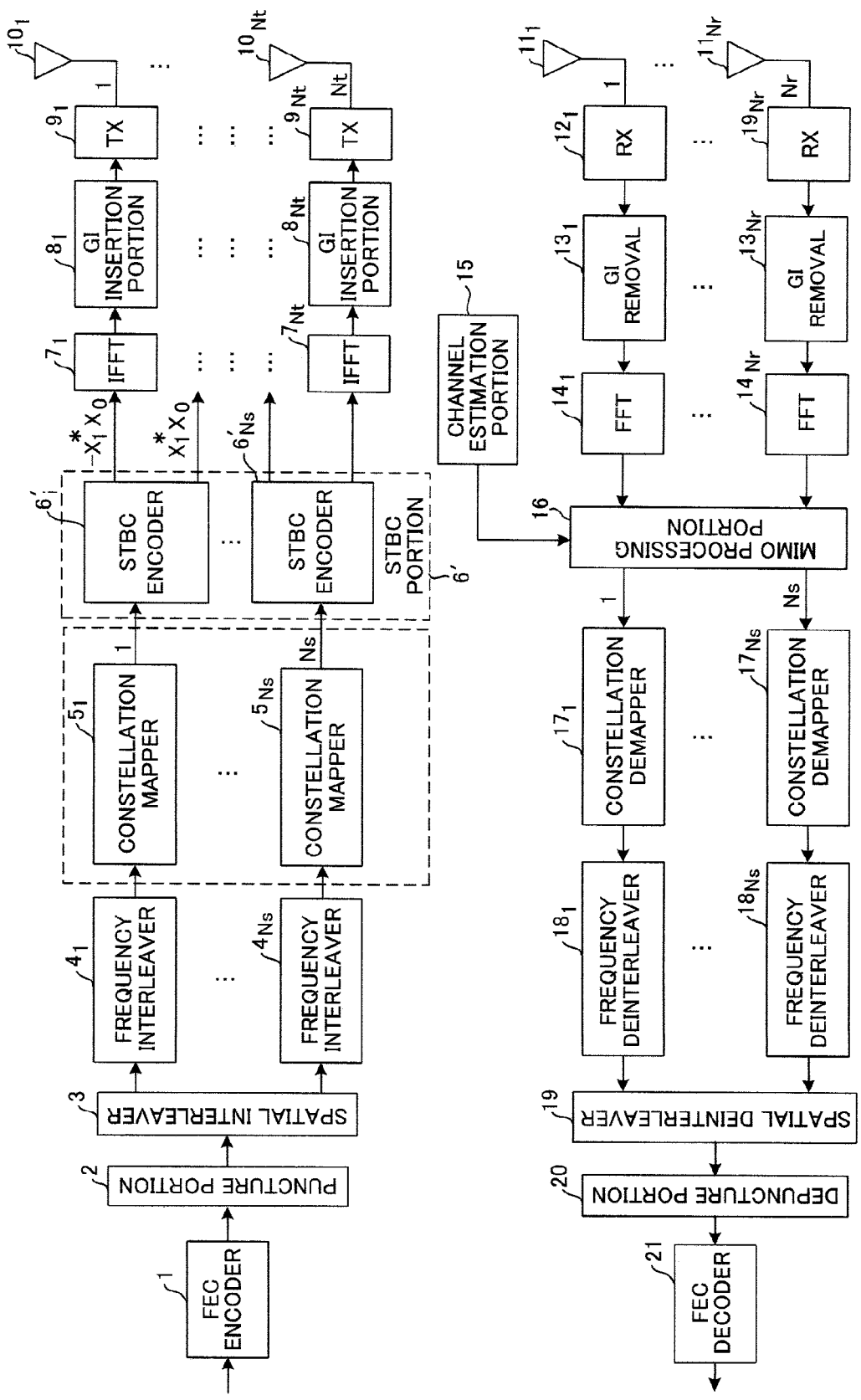
FIG. 23 is a configuration diagram of another conventional MIMO-OFDM system; and,
FIG. 24 explains STBC encoding processing.
Figure 24:
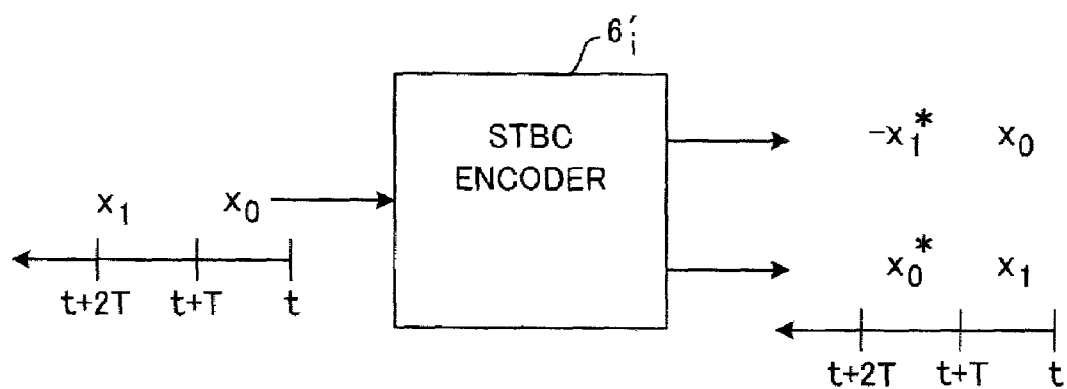

FIG. 20 is a configuration diagram of a MIMO-OFDM communication device provided with retransmit functions; portions which are the same as in the eighth embodiment of FIG. 12 are assigned the same symbols. A difference is the provision of an error detection portion 191, transmission antenna decision portion 192, transmission portion 193 which transmits ACK/NACK/transmission antenna information, transmission antenna switching control portion 194, and transmission antenna switching portion 195.

When the received data comprises errors, the reception device requests data retransmission by the transmission device, and the transmission device performs retransmission of data in response to the retransmission request. In this case, if the same antenna as used the previous time is used for retransmission, there is a strong possibility of occurrence of the same errors. That is, when performing retransmission control in a MIMO system, if the same antenna is used to transmit the retransmission data, then an antenna with a poor transmission state continues to be used, so that the improvement in error rate through retransmission is small, and the advantage of retransmission control is not obtained. In particular, this problem is serious when changes in fading and multipath are slow compared with the retransmission interval (round-trip time). Hence the transmission device in the tenth embodiment performs retransmission of data with the combination of the antennas retransmitting each data item varied, so as to reduce the error rate in retransmission. When there are errors in re-received data, the reception device combines the data with the previously received data to perform decoding.

In FIG. 20, the error detection portion 191 checks whether errors exist in the decoding results, and if errors exist, the transmission antenna decision portion 192 decides on the optimum combination of retransmission data and transmission antennas according to antenna interchange rearrangement criteria, described below, and the transmission portion 193 sends an error present/absent signal (ACK/NACK) and, when errors are present, transmission antenna combination information to the transmission device. The transmission antenna control portion 194 controls the transmission antenna portion 195 based on transmission antenna combination information sent from the reception device, and allocates STBC data series output from the STBC portion 156 to prescribed antennas.

In the case of four transmission antennas in FIG. 13, there are the following six combinations in all of antenna arrangement patterns.

[(1,2) (3,4)], [(1,2) (4,3)], [(1,3) (2,4)], [(1,3) (4,2)],
 [(1,4) (2,3)], [(1,4) (3,2)]

Hence as combination information, three bits are necessary as feedback bits for each subcarrier. In the case of three transmission antennas in FIG. 14, there are the following three combinations in all of antenna arrangement patterns.

[1,2,3], [1,3,2], [3,1,2]

Hence as combination information, two bits are necessary as feedback bits for each subcarrier.

Below, antenna rearrangement selection criteria, used to decide the optimum combination of transmission antennas, are explained.

(1) Capacity Selection Criterion

The reception device selects the optimum combination from among all combinations of transmission data and of antennas transmitting transmission data, so as to maximize capacity. That is, the antenna combination is selected so as to satisfy the following equation.

$$\Gamma = \arg\max_{Hs \in H}\left(\log_2 \det\left[I + \frac{\varepsilon_s}{2N_s N_0} H_s' H_s\right]\right) \propto \arg\max_{Hs \in H}(\det H_s' H_s) \quad (47)$$

$H_s$ is the channel matrix corresponding to the combination of the transmission data and the antennas transmitting the transmission data, H is the set of channel matrices converted according to all combinations, and det is the matrix determinant. The capacity is for example the throughput (data transmission quantity per unit time).

(2) Singular Value Selection Criterion

The reception device selects the optimum combination from among all the combinations of the transmission data and antennas to transmit the transmission data, so as to maximize the minimum singular value (equivalent to maximizing the minimum SINR). That is, the antenna arrangement pattern satisfying the following equation is selected.

$$\Gamma = \arg \max_{H_s \in H} \lambda_{min}\{H_s\} \quad (48)$$

$\lambda_{min}\{Hs\}$ is the minimum value (minimum singular value) of the diagonal elements of the diagonal matrix obtained by singular value decomposition of the channel matrix Hs.

(3) Condition Number Selection Criterion

The reception device selects the optimum combination from among all combinations of the transmission data and the antenna to transmit the transmission data, so as to minimize the channel condition number. That is, the antenna arrangement pattern satisfying the following equation is selected.

$$\Gamma = \arg \min_{H_s \in H} \frac{\lambda_{max}\{H_s\}}{\lambda_{min}\{H_s\}} \quad (49)$$

In the above equation, the numerator is the maximum value (maximum singular value) of diagonal elements of the diagonal matrix obtained by singular value decomposition of the channel matrix Hs, and the denominator is the minimum value (minimum singular value) of the diagonal elements. The smaller the channel condition number, the more uniform is the channel for each transmission path (transmission characteristics), and the reception state can be said to be good. In order to secure reliability, in this case reduction of the number of data streams is also possible.

(4) MMSE (Minimum Mean Square Error) Selection Criterion

The MSE (mean square error) of the reception device can be expressed as follows.

$$MSE(H_s) = \frac{\varepsilon_s}{2N_s}\left(I + \frac{\varepsilon_s}{2N_s N_0} H'_s H_s\right)^{-1} \quad (50)$$

The optimum combination from among all combinations of the transmission data and the antenna to transmit the transmission data is selected using the following equations, so as to minimize the trace (tr) or the determinant (det) of the MSE.

$$\Gamma = \arg \min_{H_s \in H} tr(MSE(H_s)) \propto \arg \min_{H_s \in H} tr((H'_s H_s)^{-1}) \quad (51)$$

$$\Gamma = \arg \min_{H_s \in H} \det(MSE(H_s)) \propto \arg \min_{H_s \in H} \det((H'_s H_s)^{-1}) \quad (52)$$
$$= \arg \max_{H_s \in H} \det(H'_s H_s)$$

It should be noted that in principle, the maximum capacity selection criterion is equivalent to the minimum det (MSE) criterion.

(L) Advantageous Results of the Invention

By means of this invention, reception signals received by a plurality of reception antennas are subjected to MIMO decoding processing according to a ZF decoding algorithm or an MMSE decoding algorithm to output a transmission data stream, a weighting coefficient is calculated according to the transmission-side precoding method, and the path metric is multiplied by the weighting coefficient to perform weighted decoding processing of the transmission data obtained by the MIMO decoding processing, so that the error rate performance can be improved while suppressing complexity.

By means of this invention, if the precoding method on the transmission side is a limited feedback precoding method or a spatial multiplexing precoding method, the data stream signal-to-noise ratio SINR is used as the weighting coefficient, so that the weighting coefficient for the path metric in decoding can be made large when the SINR is high, and the contribution in decoding can be increased, and as a result the error rate can be reduced and decoding performance improved. And, if the transmission side and reception side channels are known, then an eigen-mode transfer precoding method can be adopted as the precoding method on the transmission side, and the decoding performance can be improved. Hence by means of this invention, the error rate performance in MIMO-OFDM communication (spatial multiplexing, eigen-mode transfer, and limited feedback precoding methods) can be improved.

By means of this invention, the average number of conditions for a channel is calculated, and if the average number of conditions is equal to or less than a threshold value a spatial multiplexing precoding method is adopted as the precoding method, but if the average number of conditions is greater than the threshold value a limited feedback precoding method or an eigen-mode precoding method is adopted as the precoding method, so that the precoding method can be switched simply.

By means of this invention, decoding is performed with the signal-to-noise ratio SINR used as a path metric weighting coefficient, so that performance can be improved, and as a result adaptive modulation control and power control become unnecessary.

And, by means of this invention, a spatial interleaving portion which divides the transmission data stream into a plurality of transmission data streams is provided in a stage after the puncture portion or the frequency interleaver or the constellation mapping portion, so that the advantages of spatial diversity can be obtained.

In this invention, transmission data is STBC-encoded or SFBC-encoded on the transmission side, and on the receiving side the channel response matrix is converted to determine the channel matrix, and the SINR of this channel matrix is used to weight the Viterbi path metric, so that error rate performance can be improved through simple signal processing.

Further, in this invention, when a reception error is detected, the transmission data is retransmitted, and during retransmission the transmission antennas are rearranged to perform retransmission, so that the probability that data can be accurately received through retransmission can be improved.

Further, by means of this invention ZF decoding or MMSE decoding is selected depending on the modulation method, so that an appropriate decoding method can be adopted according to the modulation method, and the error rate performance is improved.

Also, by means of this invention, simple signal processing on the receiving side enables reduction of the wireless system complexity, cost, and power consumption, as well as improvements in performance.

What is claimed is:

1. A Multiple-Input/Multiple-Output Orthogonal Frequency Division Multiplexing (MIMO-OFDM) communication method for transmitting and receiving data by MIMO-OFDM communication, comprising the steps, on a transmitting side, of:
performing precoding processing of transmission data using a prescribed precoding method; and
performing OFDM modulation of the precoded data, and transmitting the modulated data from a plurality of transmission antennas,
and comprising the steps, on a receiving side, of:
performing MIMO decoding processing of reception signals received by a plurality of reception antennas, according to a Zero-Forcing (ZF) decoding algorithm or to a Minimum Mean Square Error (MMSE) decoding algorithm, and outputting transmission data stream;
calculating a weighting coefficient according to the precoding method; and
multiplying a path metric of decoding processing by the weighting coefficient, performing weighted decoding processing of said transmission data stream obtained by the MIMO decoding processing,
wherein, when the transmitting-side precoding method is a limited feedback precoding method, the weighting calculation step on the receiving side comprises the steps of:
performing channel estimation using reception signals received by the plurality of reception antennas;
determining a precoding matrix in use of precoding processing on the transmitting side based on the channel estimate; and
using the precoding matrix and the channel estimate to calculate a signal-to-noise ratio of the data stream as the weighting coefficient.

2. The MIMO-OFDM communication method according to claim 1, wherein
the step of determining a precoding matrix comprises the steps of: selecting an optimal code word existing in a code book prepared in advance using the channel estimate; and feeding back an index of the code word to the transmitting side, and
the precoding step on the transmitting side comprises the steps of: selecting a precoding matrix from a code book prepared in advance using the fed-back index; and performing precoding by multiplying the transmitted data stream by the precoding matrix.

3. The MIMO-OFDM communication method according to claim 1, wherein, when the MMSE decoding algorithm is adopted as a decoding algorithm, in the weighting coefficient calculation step, an MMSE SINR is calculated as the weighting coefficient, and in the weighted decoding processing step, weighted Viterbi decoding is performed using the MMSE SINR as the weighting coefficient of the path metric in the Viterbi decoding.

4. The MIMO-OFDM communication method according to claim 1, wherein, when the ZF decoding algorithm is adopted as a decoding algorithm, in the weighting coefficient calculation step, an ZF SINR is calculated as the weighting coefficient, and in the weighted decoding processing step, weighted Viterbi decoding is performed using the ZF SINR as the weighting coefficient of the path metric in the Viterbi decoding.

5. A MIMO-OFDM (Multiple-Input/Multiple-Output Orthogonal Frequency Division Multiplexing) communication method for transmitting and receiving data by MIMO-OFDM communication, comprising the steps, on a transmitting side, of:
performing precoding processing of transmission data using a prescribed precoding method; and
performing OFDM modulation of the precoded data, and transmitting the modulated data from a plurality of transmission antennas,
and comprising the steps, on a receiving side, of:
performing MIMO decoding processing of reception signals received by a plurality of reception antennas, according to a ZF (Zero-Forcing) decoding algorithm or to a MMSE (Minimum Mean Square Error) decoding algorithm, and outputting transmission data stream;
calculating a weighting coefficient according to the precoding method; and
multiplying a path metric of decoding processing by the weighting coefficient, performing weighted decoding processing of said transmission data stream obtained by the MIMO decoding processing, wherein
the precoding step on the transmitting side comprises the steps of:
adopting as the precoding method on the transmitting side an eigen-mode transfer precoding method when channels are known on the transmitting side and on the receiving side;
performing singular value decomposition of a channel matrix resulting from arraying the channels between the plurality of transmission antennas and the plurality of reception antennas, into a matrix;
adopting, as a precoding matrix, left-hand Ns columns (where Ns is the number of transmission data streams) in the right singular matrix obtained from the singular value decomposition; and
performing precoding by multiplying the transmission data by the precoding matrix, and wherein
the weighting calculation step on the receiving side comprises a step of using diagonal elements of a diagonal matrix obtained from the singular value decomposition as the weighting coefficients.

6. A MIMO-OFDM (Multiple-Input/Multiple-Output Orthogonal Frequency Division Multiplexing) communication method for transmitting and receiving data by MIMO-OFDM communication, comprising the steps, on a transmitting side, of:
performing precoding processing of transmission data using a prescribed precoding method; and
performing OFDM modulation of the precoded data, and transmitting the modulated data from a plurality of transmission antennas,
and comprising the steps, on a receiving side, of:
performing MIMO decoding processing of reception signals received by a plurality of reception antennas, according to a ZF (Zero-Forcing) decoding algorithm or to a MMSE (Minimum Mean Square Error) decoding algorithm, and outputting transmission data stream;
calculating a weighting coefficient according to the precoding method; and
multiplying a path metric of decoding processing by the weighting coefficient, performing weighted decoding processing of said transmission data stream obtained by the MIMO decoding processing, wherein
the precoding step on the transmitting side comprises:
a first step of adopting a spatial multiplexing transfer precoding method as the prescribed precoding method, when a channel is not known on the transmitting side; and a second step of performing the precoding processing of said transmission data using the spatial multiplexing transfer precoding method, wherein the second step includes:

using an identity matrix as a precoding matrix; and performing precoding by multiplying the transmission data by the precoding matrix, and wherein the weighting coefficient calculation step on the receiving side comprises the steps of:

performing channel estimation from reception signals received by the plurality of reception antennas; and using the channel estimate to calculate signal-to-noise ratio SINR of the data stream as the weighting coefficient.

7. A MIMO-OFDM (Multiple-Input/Multiple-Output Orthogonal Frequency Division Multiplexing) communication method for transmitting and receiving data by MIMO-OFDM communication, comprising the steps, on a transmitting side, of:

performing precoding processing of transmission data using a prescribed precoding method; and performing OFDM modulation of the precoded data, and transmitting the modulated data from a plurality of transmission antennas, and comprising the steps, on a receiving side, of:

performing MIMO decoding processing of reception signals received by a plurality of reception antennas, according to a ZF (Zero-Forcing) decoding algorithm or to a MMSE (Minimum Mean Square Error) decoding algorithm, and outputting transmission data stream;

calculating a weighting coefficient according to the precoding method; and multiplying a path metric of decoding processing by the weighting coefficient, performing weighted decoding processing of said transmission data stream obtained by the MIMO decoding processing, wherein the communication method further comprises, on the receiving side, steps of:

obtaining the maximum value and minimum value of singular values obtained in singular value decomposition of a channel matrix obtained by arraying channels between the plurality of transmission antennas and the plurality of reception antennas, into a matrix and dividing the maximum value by the minimum value; and adopting a spatial multiplexing precoding method as the precoding method when the division result is equal to or less than a threshold, and adopting a limited feedback precoding method or an eigen-mode transfer precoding method as the precoding method when the division result is greater than the threshold.

8. A MIMO-OFDM (Multiple-Input/Multiple-Output Orthogonal Frequency Division Multiplexing) reception device, which receives signals transmitted by MIMO-OFDM communication from a transmitting side, comprising:

a plurality of reception antennas, which receive signals transmitted by MIMO-OFDM communication;

a MIMO processing portion, which performs decoding processing of the reception signals according to a ZF (Zero-Forcing) decoding algorithm or a MMSE (Minimum Mean Square Error) decoding algorithm, and outputs a transmission data stream;

a weighting coefficient calculation portion, which calculates weighting coefficient according to precoding method on the transmitting side; and a decoding portion, which performs weighted decoding processing of said transmission data stream obtained by the MIMO decoding processing, by multiplying a path metric of the decoding processing by the weight coefficient, wherein the MIMO-OFDM reception device further comprises:

a channel estimation portion, which performs channel estimation using the reception signals received by the plurality of reception antennas; and a precoding matrix determination portion, which, if the precoding method on the transmitting side is a limited feedback precoding method, determines a precoding matrix to be used in precoding processing on the transmitting side based on the channel estimate, and wherein the MIMO processing portion uses the precoding matrix and the channel estimate to perform the MIMO decoding processing of the reception signals according to the ZF decoding algorithm or the MMSE decoding algorithm, and outputs a transmission data stream; and the weighting coefficient calculation portion uses the precoding matrix and the channel estimate to calculate a data stream signal-to-noise ratio SINR, and uses the signal-to-noise ratio SINR as the weighting coefficient.

9. A MIMO-OFDM (Multiple-Input/Multiple-Output Orthogonal Frequency Division Multiplexing) reception device, which receives signals transmitted by MIMO-OFDM communication from a transmitting having a plurality of transmission antennas, comprising:

a plurality of reception antennas, which receive signals transmitted by MIMO-OFDM communication;

a MIMO processing portion, which performs decoding processing of the reception signals according to a ZF (Zero-Forcing) decoding algorithm or a MMSE (Minimum Mean Square Error) decoding algorithm, and outputs a transmission data stream;

a weighting coefficient calculation portion, which calculates weighting coefficient according to precoding method on the transmitting side; and a decoding portion, which performs weighted decoding processing of said transmission data stream obtained by the MIMO decoding processing, by multiplying a path metric of the decoding processing by the weight coefficient, wherein the MIMO-OFDM reception device further comprises:

a calculation portion, which obtains the maximum value and minimum value of singular values obtained by singular value decomposition of a channel matrix obtained by arraying channels between the plurality of transmission antennas and the plurality of reception antennas, into a matrix, and dividing the maximum value by the minimum value; and a precoding method determination portion, which adopts as the precoding method a spatial multiplexing precoding method when the division result is equal to or less than a threshold, and adopts as the precoding method a limited feedback precoding method or an eigen-mode transfer precoding method when the division result is greater than a threshold.

* * * * *